(12) United States Patent
Levine

(10) Patent No.: US 12,444,067 B2
(45) Date of Patent: Oct. 14, 2025

(54) VISUAL ODOMETRY FOR MIXED REALITY DEVICES

(71) Applicant: Microsoft Technology Licensing, LLC, Redmond, WA (US)

(72) Inventor: Evan Gregory Levine, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 389 days.

(21) Appl. No.: 18/102,920

(22) Filed: Jan. 30, 2023

(65) Prior Publication Data

US 2024/0257371 A1 Aug. 1, 2024

(51) Int. Cl.
*G06K 9/00* (2022.01)
*G06T 7/50* (2017.01)
(Continued)

(52) U.S. Cl.
CPC .............. *G06T 7/55* (2017.01); *G06T 7/50* (2017.01); *G06T 7/70* (2017.01); *G06T 7/77* (2017.01);
(Continued)

(58) Field of Classification Search
CPC .. G06T 7/50; G06T 7/55; G06T 7/579; G06T 7/593; G06T 7/70; G06T 7/73; G06T 7/74; G06T 7/77; G06T 7/80; G06T 7/97; G06T 19/003; G06T 19/006; G06T 2207/10016; G06T 2207/10028; G06T 2207/20076; G06T 2207/20228; G06T 2207/30244; G06V 10/22; G06V 10/25; G06V 10/40;
(Continued)

(56) References Cited

U.S. PATENT DOCUMENTS

| | | | |
|---|---|---|---|
| 10,546,387 B2 * | 1/2020 | Hirzer | G06T 7/11 |
| 10,991,155 B2 * | 4/2021 | Bouttefroy | G06V 10/764 |
| 11,940,277 B2 * | 3/2024 | Roumeliotis | G06T 7/73 |

FOREIGN PATENT DOCUMENTS

| | | |
|---|---|---|
| CN | 109993113 A | 7/2019 |
| CN | 111288989 A | 6/2020 |
| WO | 2022150904 A1 | 7/2022 |

OTHER PUBLICATIONS

Engel, et al., "Direct Sparse Odometry", In Journal of IEEE Transactions on Pattern Analysis and Machine Intelligence, vol. 40, Issue 3, Apr. 12, 2017, pp. 611-625.

(Continued)

*Primary Examiner* — Eric Rush
(74) *Attorney, Agent, or Firm* — Workman Nydegger

(57) ABSTRACT

Techniques for identifying a 3D feature represented in images in a buffer are disclosed. The images comprise a first and second image, and the images provide data that is usable to determine a depth for the 3D feature. A 2D feature point that is an observation of the 3D feature is identified. A pseudo measurement is computed for the 2D feature point. This measurement includes a depth and an uncertainty value. A first joint uncertainty is determined for the depth using the pseudo measurement. The first image is ejected from the buffer, resulting in a reduction to an amount of the data that is usable to determine the depth. The pseudo measurement is tuned until a resulting second joint uncertainty, which is based on the pseudo measurement, is within a threshold level of similarity to the first joint uncertainty.

20 Claims, 16 Drawing Sheets

(51) Int. Cl.
*G06T 7/55* (2017.01)
*G06T 7/70* (2017.01)
*G06T 7/77* (2017.01)
*G06V 10/44* (2022.01)
*G06V 10/46* (2022.01)
*G06V 10/74* (2022.01)
*G06V 10/77* (2022.01)

(52) U.S. Cl.
CPC .............. *G06V 10/44* (2022.01); *G06V 10/46* (2022.01); *G06V 10/761* (2022.01); *G06V 10/77* (2022.01); *G06T 2207/30244* (2013.01); *G06V 2201/12* (2022.01)

(58) Field of Classification Search
CPC ...... G06V 10/44; G06V 10/46; G06V 10/462; G06V 10/513; G06V 10/70; G06V 10/72; G06V 10/761; G06V 10/77; G06V 10/80; G06V 10/803; G06V 10/806; G06V 10/96; G06V 10/98; G06V 20/10; G06V 20/20; G06V 20/40; G06V 2201/12; G01C 21/165; G01C 21/1652; G01C 21/1656; G01C 21/183; G01C 21/188; G01C 21/20; G01C 21/206; G05D 1/0246; G05D 1/2051; G06F 3/011; G06F 3/012; G06F 3/013; G06F 3/0304; G06F 3/0325; H04N 13/00; H04N 13/106; H04N 13/122; H04N 13/128; H04N 13/204; H04N 13/207; H04N 13/239; H04N 13/271; H04N 13/293; H04N 2013/0074; H04N 2013/0081

USPC ....... 382/100, 103, 106, 107, 153, 154, 181, 382/190, 224, 225, 282, 285, 291, 305, 382/307, 312, 325; 345/419, 421, 422, 345/424, 428, 633, 643; 348/42–44, 46, 348/51–53, 61; 702/127, 150–153, 155, 702/158, 166, 182, 189

See application file for complete search history.

(56) References Cited

OTHER PUBLICATIONS

Hsiung, et al., "Information Sparsification in Visual-Inertial Odometry", In IEEE/RSJ International Conference on Intelligent Robots and Systems (IROS), Oct. 1, 2018, pp. 1146-1153.

Leutenegger, et al., "Keyframe-Based Visual-Inertial Odometry Using Nonlinear Optimization", In the International Journal of Robotics Research, vol. 34, Issue 3, Mar. 2015, 8 Pages.

Eckenhoff, et al., "Continuous Preintegration Theory for Graph-based Visual-Inertial Navigation", ARXIV.org, May 7, 2018, 21Pages.

International Search Report and Written Opinion received for PCT Application No. PCT/US2023/085606, (MS#412682-PCT01) Apr. 22, 2024, 14 pages.

Tyagi, et al., "DVIO: Depth—Aided Visual Inertial Odometry for RGBD Sensors", IEEE International Symposium on Mixed and Augmented Reality (ISMAR), Oct. 4, 2021, pp. 193-201.

International Preliminary Report on Patentability (Chapter I) received for PCT Application No. PCT/US2023/085606, mailed on Aug. 14, 2025, 8 pages.

* cited by examiner

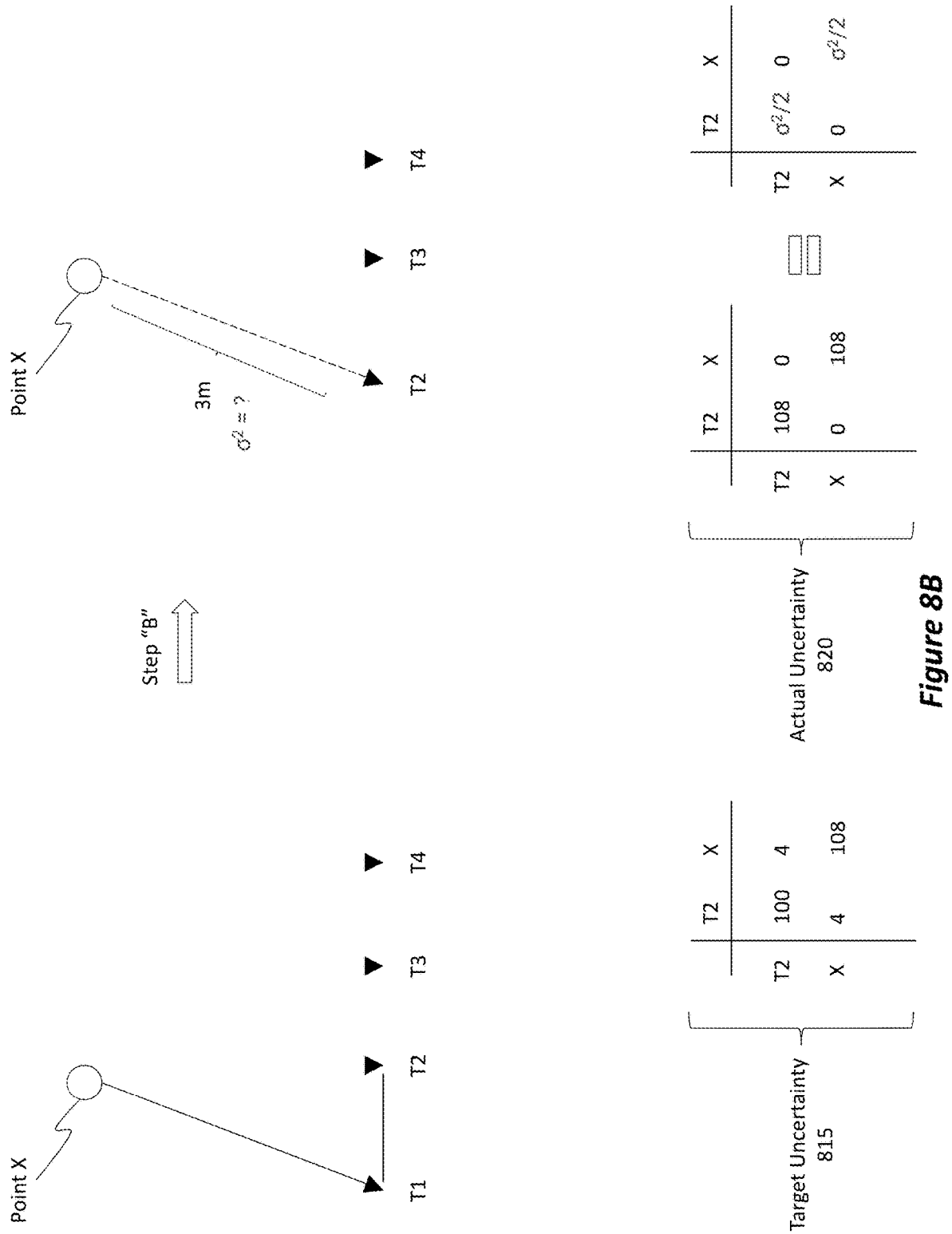

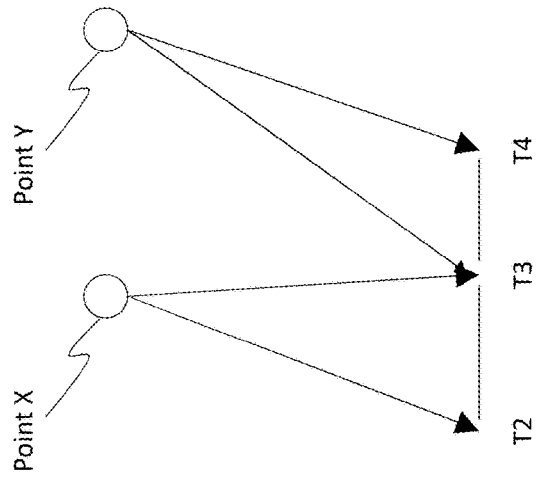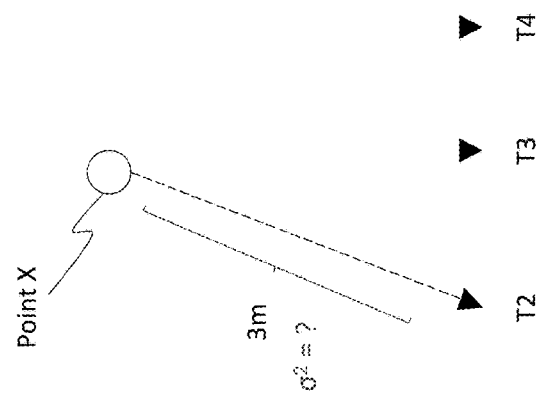
Figure 8C

VISUAL ODOMETRY FOR MIXED REALITY DEVICES

BACKGROUND

Mixed-reality (MR) systems, which include virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

An MR system can be used to display various different types of information to a user. Some of that information is displayed in the form of augmented reality or virtual reality content, which can also be referred to as a "hologram." That is, as used herein, the term "hologram" generally refers to image content that is displayed by the MR system. In some instances, the hologram can have the appearance of being a three-dimensional (3D) object while in other instances the hologram can have the appearance of being a two-dimensional (2D) object.

Often, holograms are displayed in a manner as if they are a part of the actual physical world. For instance, a hologram of a flower vase might be displayed on a real-world table. In this scenario, the hologram can be considered as being "locked" or "anchored" to the real world. Such a hologram can be referred to as a "world-locked" hologram or a "spatially-locked" hologram that is spatially anchored to the real world. Regardless of the user's movements, a world-locked hologram will be displayed as if it was anchored or associated with the real-world. A state estimator, such as a Kalman filter, is typically used to facilitate the display of a world-locked hologram. A state estimator enables the projection of content to a known location or scene, despite various movements occurring. The state estimator can provide a transformation matrix used to project content and display holograms.

In contrast, a field of view (FOV) locked hologram is a type of hologram that is persistently displayed at a particular location in the user's FOV regardless of any movement of the user's FOV. For instance, a FOV locked hologram may be persistently displayed in the upper right corner of the user's FOV.

To properly display a world-locked hologram, the MR system is tasked with gaining a spatial understanding of its environment and its pose relative to that environment. This spatial understanding is often achieved via use of the MR system's cameras and inertial measurement units (IMUs), which include various accelerometers, gyroscopes, and magnetometers. The MR system feeds the data generated from these subsystems to a motion model, which is then relied on to anchor the hologram to a position in the real world. With that understanding, there is a need in the technical field to improve how a pose of an MR system is determined or estimated.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for (i) determining, from a number of estimated states included in a buffer, a level of depth uncertainty for a three-dimensional (3D) feature represented in a set of images, (ii) ejecting one of the estimated states from the size-limited buffer, resulting in a modification of available data that is usable to determine depth for the 3D feature, and (iii) attempting to preserve the level of depth uncertainty even after the one estimated state has been ejected.

Some embodiments access a buffer of estimated states that are generated based on visual observations derived from multiple images. The estimated states comprise pose information as reflected in the multiple images. A 3D feature that is commonly represented in the images is identified. The embodiments also identify, within each one of the images, a two-dimensional (2D) feature point that is an observation of the 3D feature. Consequently, multiple 2D feature points are identified. The images provide data that is usable to determine a depth for the 3D feature. The embodiments determine that a first estimated state is to be ejected from the buffer. The embodiments also compute, for at least one of the 2D feature points, a corresponding representative measurement comprising a corresponding depth and a corresponding uncertainty value for that depth. A first joint uncertainty is determined for the depth of the 3D feature using at least the representative measurements. The embodiments eject the first estimated state from the buffer, resulting in a modification to the data that is usable to determine the depth for the 3D feature. After the first estimated state is ejected, the representative measurements are tuned until a resulting second joint uncertainty, which is based on the tuned representative measurements, is within a threshold level of similarity to the first joint uncertainty despite there being the modification to the data that is usable to determine the depth for the 3D feature.

Some embodiments attempt to preserve a level of uncertainty for a computed depth of a three-dimensional (3D) feature that is represented within a set of images, even after one of the images is subsequently no longer available to assist in determining the depth. For instance, some embodiments identify a 3D feature that is represented in images included in a buffer. The images comprise a first image and a second image, and the images provide data that is usable to determine a depth for the 3D feature. The embodiments identify, within the images, a two-dimensional (2D) feature point that is an observation of the 3D feature. The embodiments compute, for the 2D feature point, a pseudo measurement comprising a depth and an uncertainty value for that depth. A first joint uncertainty is determined for the depth of the 3D feature using the pseudo measurement. The embodiments eject the first image from the buffer, resulting, at least temporarily, in a reduction to an amount of the data that is usable to determine the depth for the 3D feature. The pseudo measurement is tuned until a resulting second joint uncertainty, which is based on the pseudo measurement, is within a threshold level of similarity to the first joint uncertainty.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 8A, 8B, and 8C illustrate various operations to implement the disclosed principles.

DETAILED DESCRIPTION

Figure 1:
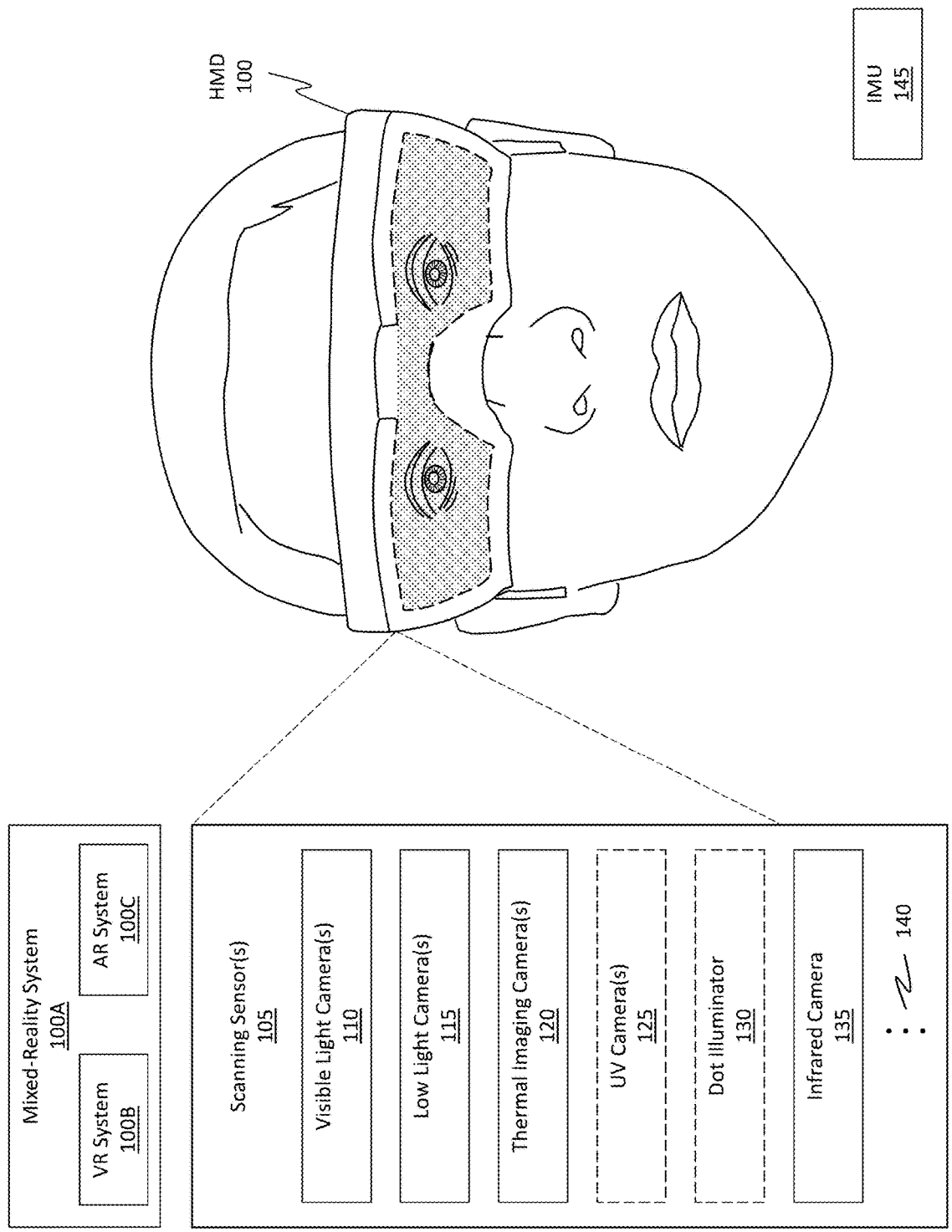
FIG. 1 illustrates an example head mounted device (HMD) configured to perform the disclosed operations.

The disclosed embodiments (i) determine, from a number of estimated states included in a buffer, a level of depth uncertainty for a three-dimensional (3D) feature represented in a set of images, (ii) eject one of the estimated states from the buffer, resulting in a modification of available data that is usable to determine depth for the 3D feature, and (iii) attempt to preserve the level of depth uncertainty even after the one estimated state has been ejected.

For example, some embodiments access a buffer of estimated states that are generated based on visual observations derived from multiple images. The estimated states include pose information as reflected in the images. A 3D feature that is commonly represented in the images is identified. The embodiments also identify a 2D feature point that is an observation of the 3D feature. The images provide data that is usable to determine a depth for the 3D feature. The embodiments determine that a first estimated state is to be ejected from the buffer. The embodiments compute, for at least one of the 2D feature points, a corresponding representative measurement comprising a depth and an uncertainty value for that depth. A first joint uncertainty is determined for the depth of the 3D feature using at least the representative measurement. After the first estimated state is ejected, the representative measurements are tuned until a resulting second joint uncertainty, which is based on the tuned representative measurement, is within a threshold level of similarity to the first joint uncertainty.

Some embodiments identify a 3D feature that is represented in images included in a buffer. The images comprise a first and second image, and the images provide data that is usable to determine a depth for the 3D feature. The embodiments identify, within the images, a 2D feature point that is an observation of the 3D feature. The embodiments compute, for the 2D feature point, a pseudo measurement comprising a depth and an uncertainty value for that depth. A first joint uncertainty is determined for the depth of the 3D feature using the pseudo measurement. The first image is ejected from the buffer, resulting, at least temporarily, in a reduction to an amount of the data that is usable to determine the depth for the 3D feature. The pseudo measurement is tuned until a resulting second joint uncertainty, which is based on the pseudo measurement, is within a threshold level of similarity to the first joint uncertainty.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments provide significant benefits, advantages, and practical applications with regard to how a device's pose is determined. By improving this pose-determining process, the embodiments also improve how visual imagery is rendered and displayed for a user to view and interact with. Thus, the embodiments not only improve the visual display of information but they also improve how the user interacts with a computer system. Accordingly, these and numerous other benefits will now be described in more detail throughout the remaining portions of this disclosure.

Example MR Systems and HMDs

Attention will now be directed to FIG. 1, which illustrates an example of a head mounted device (HMD) 100. HMD 100 can be any type of MR system 100A, including a VR system 100B or an AR system 100C. It should be noted that while a substantial portion of this disclosure is focused on the use of an HMD, the embodiments are not limited to being practiced using only an HMD. For instance, the disclosed operations can optionally be performed by a cloud service that is communicating with an HMD.

HMD 100 is shown as including scanning sensor(s) 105 (i.e. a type of scanning or camera system), and HMD 100 can use the scanning sensor(s) 105 to scan environments, map environments, capture environmental data, and/or generate any kind of images of the environment. Scanning sensor(s) 105 may comprise any number or any type of scanning device, without limit.

In some embodiments, scanning sensor(s) 105 include visible light camera(s) 110, low light camera(s) 115, thermal imaging camera(s) 120, potentially (though not necessarily, as represented by the dotted box in FIG. 1) ultraviolet (UV) camera(s) 125, potentially (though not necessarily, as represented by the dotted box) a dot illuminator 130, and even an infrared camera 135. The ellipsis 140 demonstrates how any other type of camera or camera system (e.g., depth cameras, time of flight cameras, virtual cameras, depth lasers, etc.) may be included among the scanning sensor(s) 105.

It should be noted that any number of cameras may be provided on the HMD 100 for each of the different camera types (aka modalities). That is, the visible light camera(s) 110 may include 1, 2, 3, 4, 5, 6, 7, 8, 9, 10, or more than 10 cameras. Often, however, the number of cameras is at least 2 so the HMD 100 can perform passthrough image generation and/or stereoscopic depth matching. Similarly, the low light camera(s) 115, the thermal imaging camera(s) 120, and the UV camera(s) 125 may each respectively include 1, 2, 3, 4, 5, 6, 7, 8, 9, 10, or more than 10 corresponding cameras. HMD 100 is further shown as including an inertial measurement unit (IMU) 145. Further details on this feature will be provided shortly.

Figure 2:
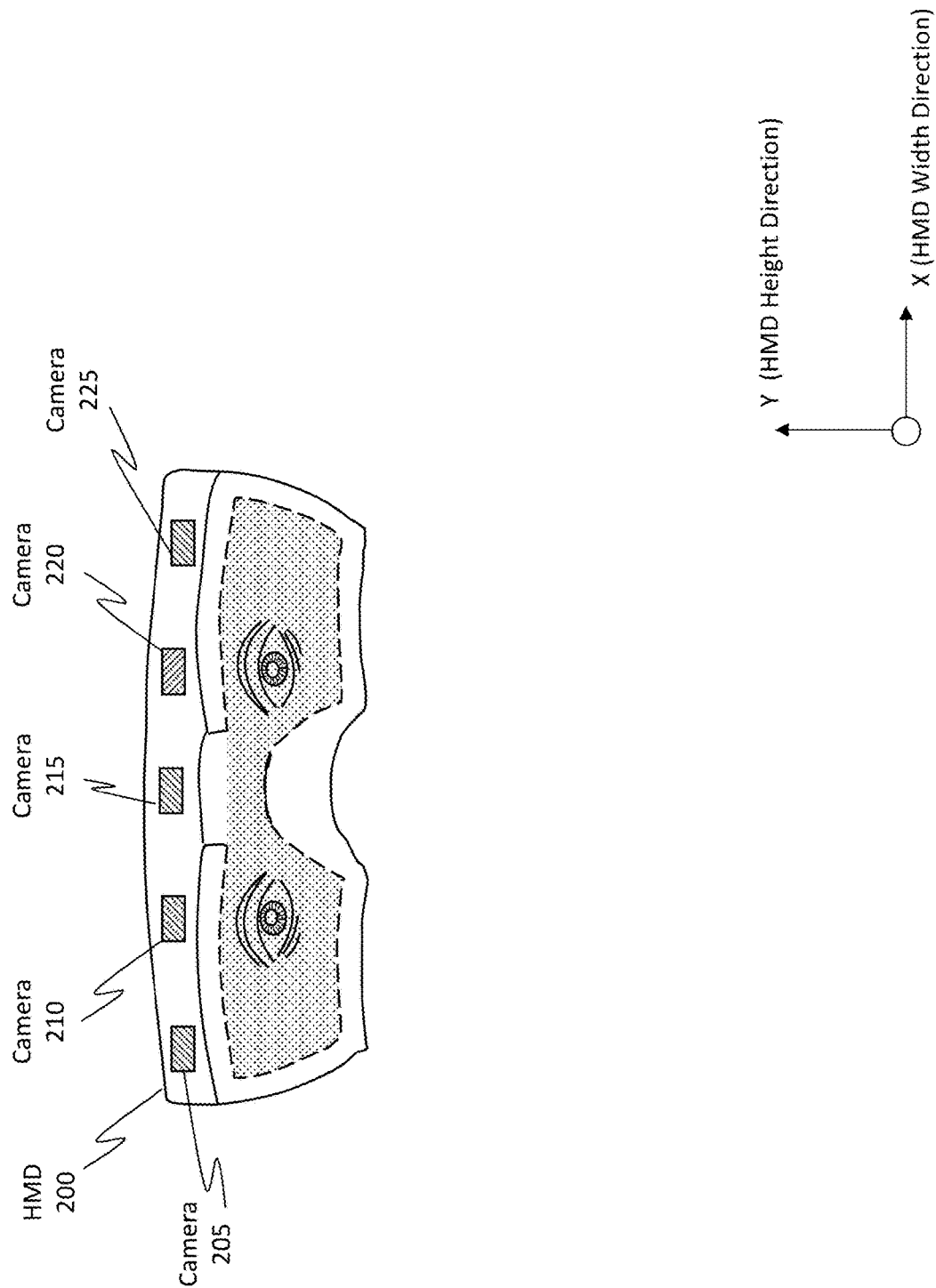
FIG. 2 illustrates another configuration of an HMD.

FIG. 2 illustrates an example HMD 200, which is representative of the HMD 100 from FIG. 1. HMD 200 is shown as including multiple different cameras, including cameras 205, 210, 215, 220, and 225. Cameras 205-225 are representative of any number or combination of the visible light camera(s) 110, the low light camera(s) 115, the thermal imaging camera(s) 120, and the UV camera(s) 125 from FIG. 1. While only 5 cameras are illustrated in FIG. 2, HMD 200 may include more or less than 5 cameras. Any one of those cameras can be referred to as a "system camera."

Figure 3:
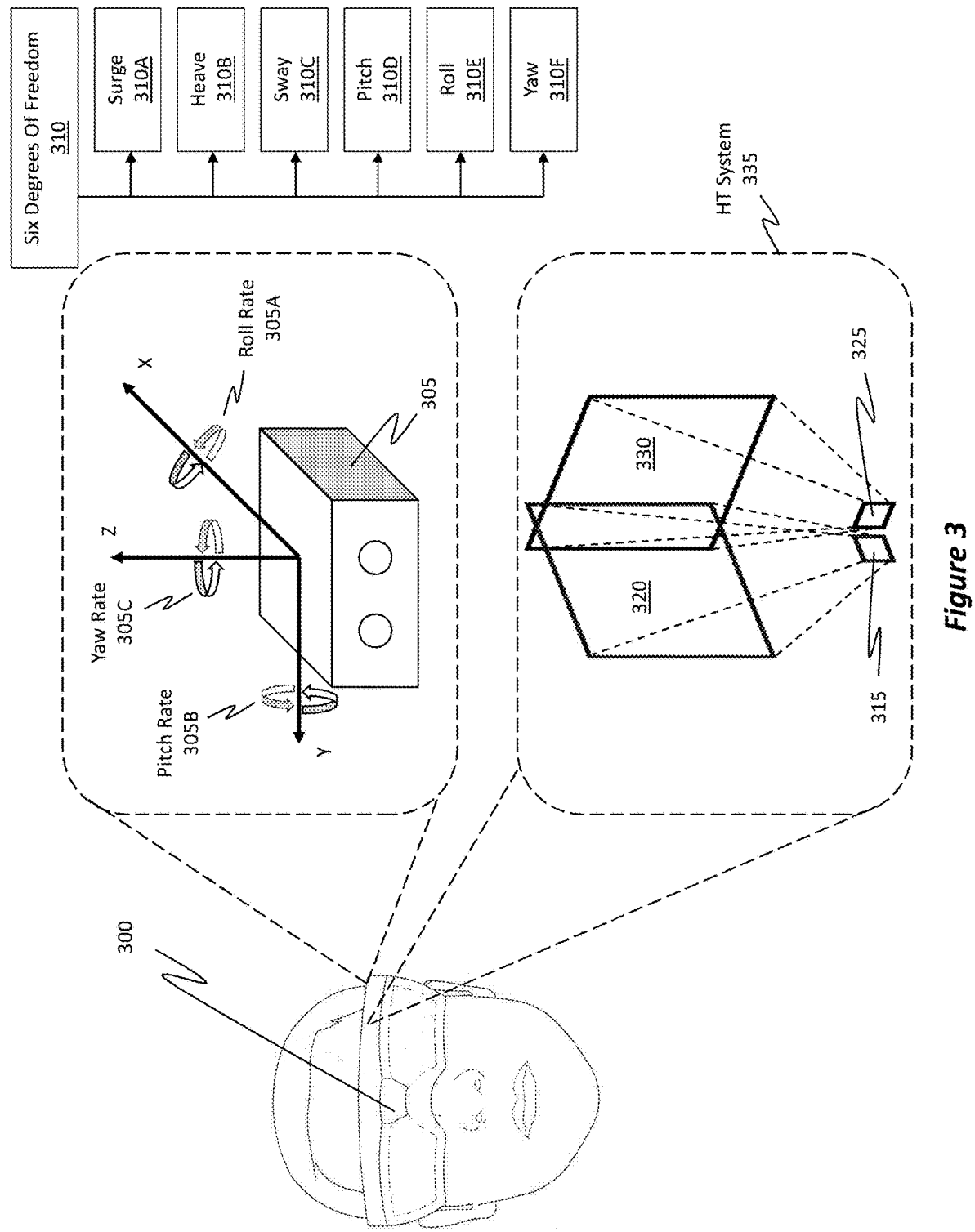
FIG. 3 illustrates how an HMD can include an inertial measurement unit (IMU).

FIG. 3 illustrates an example HMD 300 that is representative of the HMDs and MR systems discussed thus far. The descriptions "MR device" and "MR system" can be used interchangeably with one another. In some cases, HMD 300 is itself considered as an MR device. Therefore, references to HMDs, MR devices, or MR systems generally relate to one another and may be used interchangeably.

In accordance with the disclosed principles, HMD 300 is able to stabilize the visual placement of any number of holograms (e.g., 1, 2, 3, 4, 5, 10, 20, 30, 40, 50, or more than 50 holograms) rendered by the display of HMD 300 using IMU data and a motion model. This stabilization may occur even when certain position data, which is used for the visual placement, has conflicts or conflicting information as a result of it being collected while the HMD 300 was operating in a moving environment.

HMD 300 is shown as including an IMU 305, which is representative of the IMU 145 from FIG. 1. IMU 305 is a type of device that measures force, angular adjustments/rates, orientation, acceleration, velocity, gravitational forces, and sometimes even magnetic fields. To do so, IMU 305 may include any number of data acquisition devices, which include any number of accelerometers, gyroscopes, and even magnetometers.

IMU 305 can be used to measure a roll rate 305A, a pitch rate 305B, and a yaw rate 305C. The IMU 305 can be used to measure the sum of gravitational acceleration and body acceleration in an inertial frame. IMU 305 can also measure angular rate as well as potentially an absolute orientation. It will be appreciated, however, that a motion sensor, which can include IMU 305, can measure changes in any of the six degrees of freedom 310. Six degrees of freedom 310 refers to the ability of a body to move in three-dimensional space. As an example, suppose HMD 300 is operating in the cockpit of an airplane rolling along a runway. Here, the cockpit may be considered as a "first" environment and the runway may be considered as a "second" environment. The first environment is moving relative to the second environment. Regardless of whichever environment HMD 300 is operating within, the movements of one environment relative to another environment (as recorded or monitored by at least some of HMD 300's data acquisition devices) can be detected or measured in any one or more of the six degrees of freedom 310.

Six degrees of freedom 310 include surge 310A (e.g., forward/backward movement), heave 310B (e.g., up/down movement), sway 310C (e.g., left/right movement), pitch 310D (e.g., movement along a transverse axis), roll 310E (e.g., movement along a longitudinal axis), and yaw 310F (e.g., movement along a normal axis). Relatedly, 3 DOF characteristics include only the pitch 310D, roll 310E, and yaw 310F. The embodiments are able to use 6 DOF information or 3 DOF information.

Accordingly, IMU 305 can be used to measure changes in force and changes in movement, including any acceleration changes of HMD 300. This collected data can be used to help determine a position, a pose, and/or a perspective of HMD 300 relative to its environment. To improve the position and pose determinations, the data generated by IMU 305 can augment or supplement data collected by a head tracking (HT) system. The pose information is used to display holograms in the scene.

FIG. 3 also shows a first HT camera 315, with its corresponding field of view (FOV) 320 (i.e. the observable area of HT camera 315, or rather the observable angle through which HT camera 315 is able to capture electromagnetic radiation), and a second HT camera 325, with its corresponding FOV 330. While only two HT cameras are illustrated, it will be appreciated that any number of HT cameras may be used on HMD 300 (e.g., 1 camera, 2, 3, 4, 5, or more than 5 cameras). Furthermore, these cameras may be included as a part of a HT system 335 implemented on HMD 300.

HT cameras 315 and 325 can be any type of HT camera. In some cases, HT cameras 315 and 325 may be stereoscopic HT cameras in which a part of FOVs 320 and 330 overlap with one another to provide stereoscopic HT operations. In other embodiments, HT cameras 315 and 325 are other types of HT cameras. In some cases, HT cameras 315 and 325 are able to capture electromagnetic radiation in the visible light spectrum and generate visible light images. In other cases, HT cameras 315 and 325 are able to capture electromagnetic radiation in the infrared (IR) spectrum and generate IR light images. In some cases, HT cameras 315 and 325 include a combination of visible light sensors and IR light sensors. In some cases, HT cameras 315 and 325 include or are associated with depth detection functionalities for detecting depth in the environment.

Accordingly, HMD 300 is able to use display positioning information generated by IMU 305 and display positioning information generated by HT system 335 to determine HMD 300's position and pose. This position and pose information will then enable HMD 300 to accurately render a hologram within an MR scene provided by HMD 300. For instance, if a hologram is to be fixedly displayed on a wall of a room, then the position and pose of HMD 300 are used during the hologram's placement operation to ensure that the hologram is rendered/placed at the proper wall location.

More specifically, to complete the hologram placement operation, the information from the HT cameras and the information from the IMU(s) can be combined using a motion model, such as a Kalman filter, to provide robust head tracking position and pose estimation and to perform hologram placement using the position and pose information. As used herein, a "Kalman" filter is a type of combining algorithm in which multiple sensor inputs, which were collected over a defined time period and which were collected using the IMU(s) and HT cameras, are combined together to provide more accurate display positioning information than that which could be achieved by either sensor alone. This combination may occur even in the face of statistical noise and/or other inaccuracies. This combined data is what is used during hologram placement. The disclosed embodiments are designed to improve how poses are estimated. Accordingly, the remaining portion of this disclosure will now further elaborate on various techniques for estimating a pose of the device.

Example Architecture(s)

Figure 4:
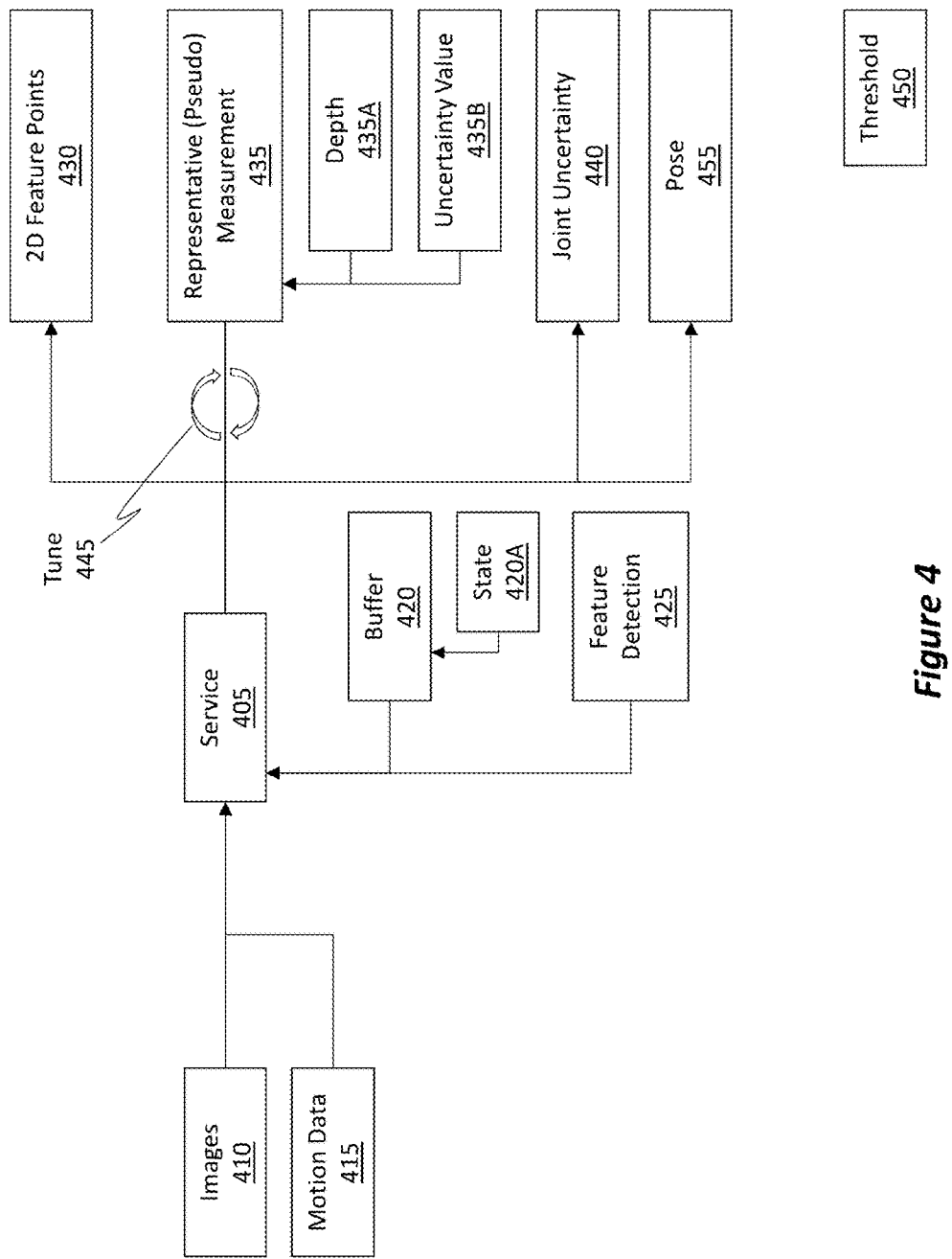
FIG. 4 illustrates an example architecture that can be implemented to improve how poses are estimated.

Attention will now be directed to FIG. 4, which illustrates an example architecture 400 that can provide the benefits mentioned earlier. Architecture 400 is shown as including a service 405. Service 405 can be any type of service. As used herein, the term "service" refers to a computer program that is tasked with performing automated actions or events based on input. Service 405 can optionally be a cloud-based service operating in a cloud environment. Alternatively, service 405 can be a local service operating on a local device. In some cases, service 405 can be a hybrid comprising a cloud-based component and a local component. Generally, service 405 is tasked with performing a number of operations. One operation involves determining, from a number of images, a level of depth uncertainty for a three-dimensional (3D) feature (e.g., an object in an environment) that is represented in those images. These images are stored in a size-limited buffer. At least one of the images will eventually be ejected from the buffer, resulting in a modification of the available data that is usable to determine the depth for the 3D feature. Service 405 is further tasked with attempting to preserve the level of depth uncertainty even after the image has been ejected.

Architecture 400 shows how a set of images 410 can be fed as input to the service 405. These images can be generated by any of the camera types or modalities discussed earlier. For instance, the images 410 can optionally be generated by an MR system. The images 410 are of an environment, and the images 410 typically include related content.

Figure 5:
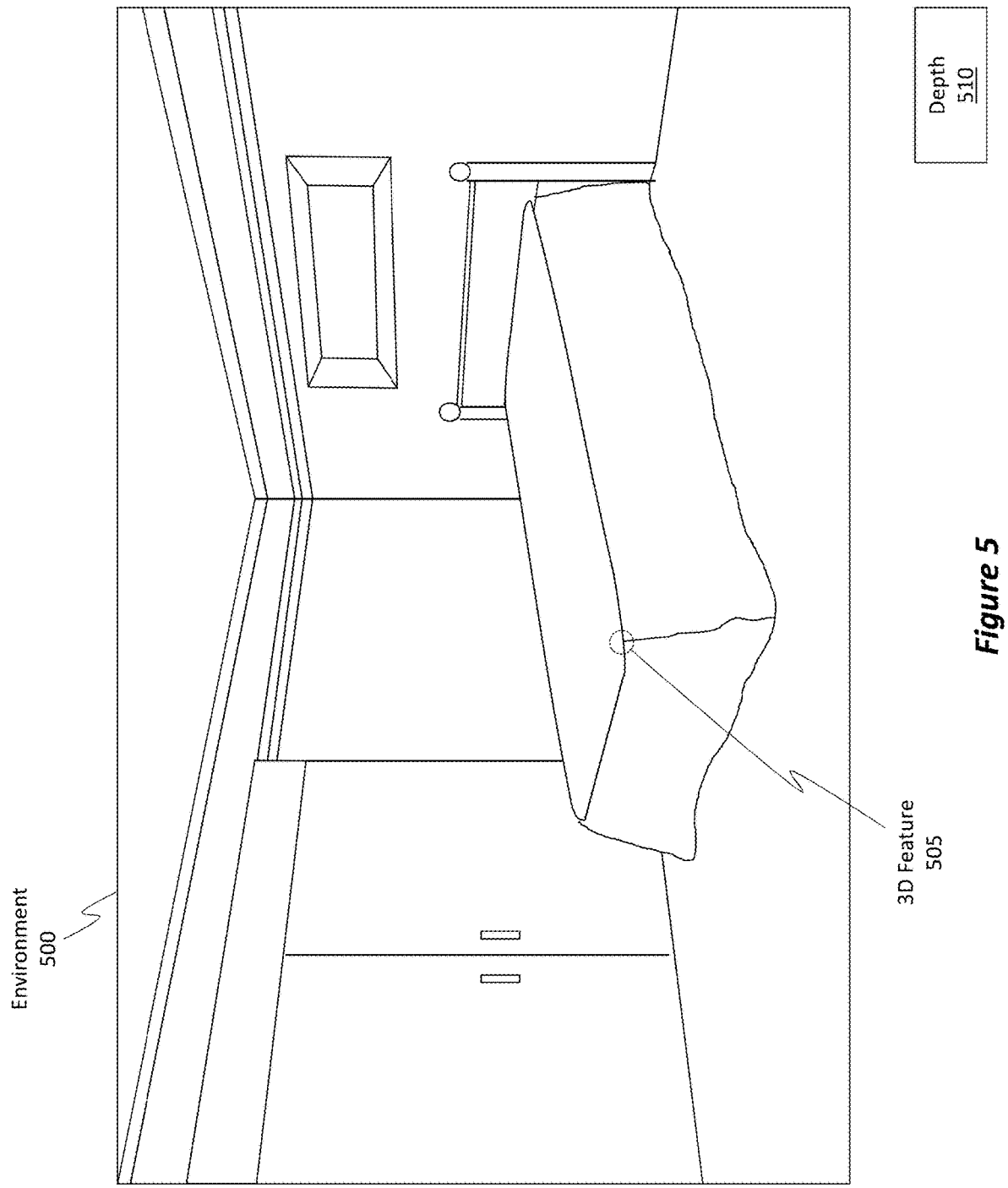
FIG. 5 illustrates an example environment.

As an example, FIG. 5 shows one example of an environment 500; in this case, a bedroom. Of course, any type of environment can be representative. FIG. 5 also shows a particular 3D feature 505 that is included in the environment 500; in this case, the 3D feature 505 is the corner of the bed. Furthermore, the 3D feature 505 has a determined depth 510 with respect to the position of a camera that may take an image of the environment 500.

Figure 6:
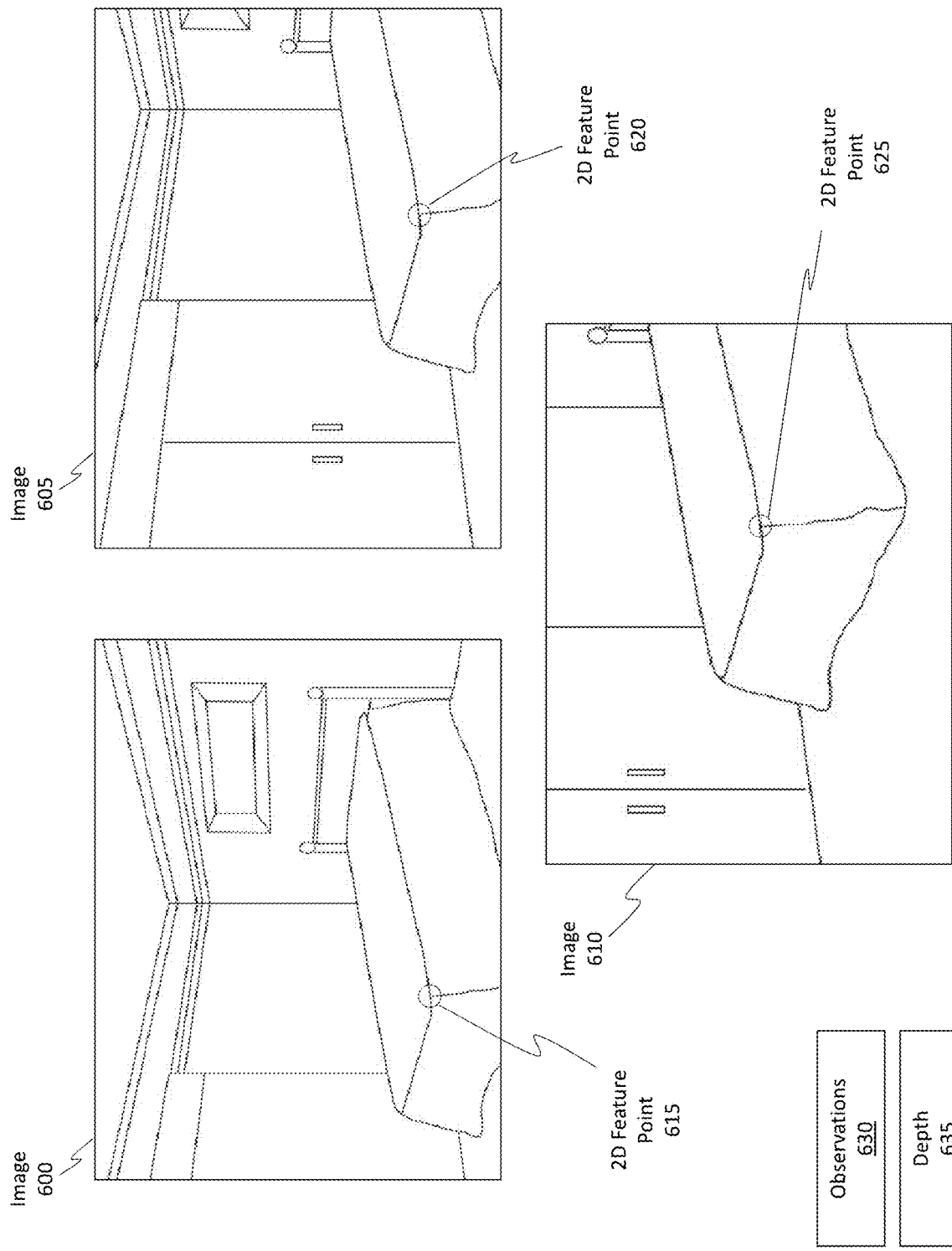
FIG. 6 illustrates example images of the environment.

FIG. 6 shows three different images of the environment 500 of FIG. 5. For instance, FIG. 6 shows a first image 600, a second image 605, and a third image 610. Notice, all three images include an observation of the 3D feature 505 from FIG. 5. That is, the two-dimensional (2D) feature point 615 refers to a set of one or more image pixels that represent a detectable feature or object included in the environment 500. In this case, the 2D feature point 615 is a pixel-based observation of the 3D feature 505. Similarly, the 2D feature point 620 is a set of one or more pixels in the image 605; these one or more pixels also represent an observation of the 3D feature 505. To complete the example, the 2D feature point 625 is also a set of one or more pixels in the image 610, and these pixel(s) also represent the 3D feature 505.

Returning to FIG. 4, the images 410 may be representative of the images 600, 605, and 610 from FIG. 6. These images 410 are fed as input to the service 405.

In some embodiments, motion data 415 can also be fed as input to the service 405. The motion data 415 can include data generated by an IMU, such as the IMU discussed previously.

The service 405 causes the images 410 to be stored in a buffer 420. The buffer 420 can also be referred to as a size-limited buffer 420, a queue, or even as a "sliding window" of images. The size of the buffer 420 is often set so that it can store a select number of images and/or a select number of estimate states, as shown by state 420A. Often, the number of images is between 2 images and 16 images. In some cases, the number of images can exceed 16. The state 420A is generated based on visual observations derived from the images. The state 420A can include pose information as reflected in the image. The state 420A can include other variable information, such as timing information, velocity information, and/or intrinsic or extrinsic parameters of sensors.

The service 405 is also tasked with performing feature detection 425 on the images 410. By "feature detection," it is meant that the service 405 is able to compute various abstractions for an image and then make a focused or localized decision for every pixel to determine whether there is content of a particular type represented by the pixel. In other words, feature detection refers to the process of categorizing or assigning a type to each pixel, where the assigned category is based on what that pixel represents. For instance, if a group of pixels in an image illustrate a dog, then each of those pixels can be classified as being of a "dog" category or type. Feature detection performs this classification. The specific types of categories can also be tailored such that the feature detection searches for specific types of content, such as performs corners, edges, or other distinguishable objects.

With reference to FIG. 6, the service 405 performed feature detection on the images 600, 605, and 610. The service 405 identified the 2D feature points 615, 620, and 625 as being observations 630 of the 3D feature 505 from FIG. 5. Each of those feature points 615, 620, and 625 can have a corresponding depth 635 value determined, where this depth 635 is an attempted approximation of the actual depth 510 of the 3D feature 505 relative to the camera that generated the images 600, 605, and 610.

Figure 7:
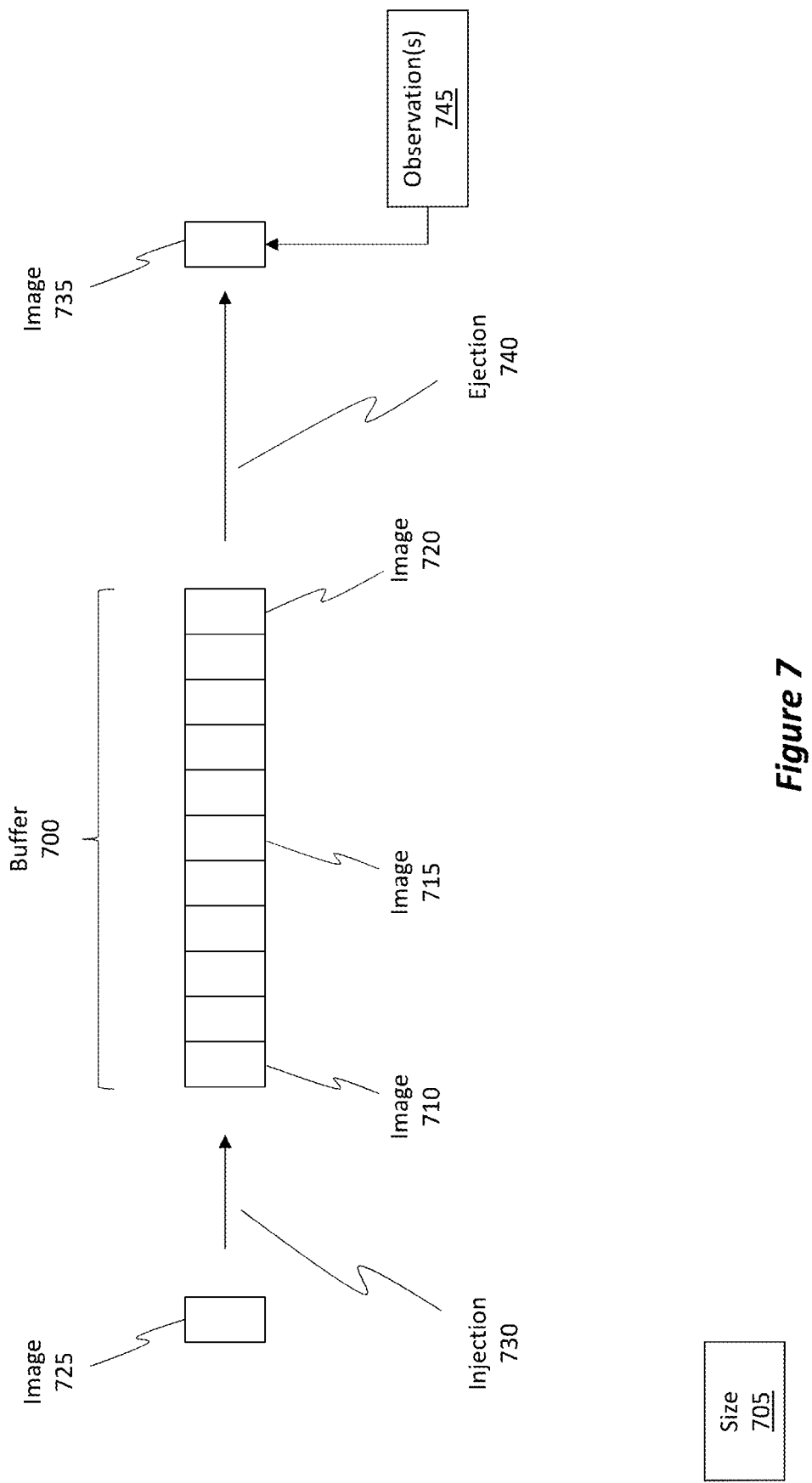
FIG. 7 illustrates a buffer.

Returning to FIG. 4 and as mentioned earlier, the service 405 causes the images 410 to be stored in the buffer 420. In some cases, the feature detection 425 occurs while the images 410 are stored in the buffer 420. In other cases, the feature detection 425 occurs prior in time to when the images 410 are stored in the buffer 420. FIG. 7 is illustrative of the buffer 420.

FIG. 7 shows a buffer 700, which is representative of the buffer 420. As mentioned earlier, the size 705 of the buffer 700 is limited so that it supports or can include a set number of images.

FIG. 7 shows a number of images (e.g., the rectangles) stored in the buffer 700. For instance, among others, the buffer 700 is currently storing image 710, image 715, and image 720. Currently, the buffer 700 is at capacity with regard to its storage abilities. If a new image (e.g., image 725) is to be injected or inserted into the buffer 700 (e.g., injection 730), then an existing image (e.g., image 735) will need to be ejected (e.g., ejection 740) from the buffer 700.

Recall, the various different images in the buffer include observations of a 3D feature. These observations are used to determine the depth for that 3D feature. The depth data is useful because it helps to localize the MR system by enabling the MR system to determine its pose relative to the environment. The display of a hologram is dependent on the MR system's pose. Having accurate and robust depth data is thus desirable in order to enable the MR system to provide high quality image content.

Furthermore, it is often the case that the older images in the buffer 700 (e.g., as determined by each image's corresponding timestamp) include a rich amount of data that can be used to determine the 3D feature's depth. For instance, it is often the case that the older images in the buffer 700 observe the 3D feature from a different vantage point or perspective than the newer images. In some cases, the older images observe the 3D feature from a different depth than the newer images. The combination of the older and newer images thus provides a larger baseline (i.e. a difference in the perceived perspectives represented in the images) from which to compute a depth for the 3D feature, and it is typically the case that a larger baseline enables a more accurate depth determination because the larger baseline results in less uncertainty with regard to the depth computation.

When one of the images is ejected from the buffer 700 (particularly one of the older images), then the amount of available data or observation(s) 745 that can be used to compute the depth is often reduced or at least modified. It is often the case that the oldest image is ejected first, such as in a first in first out (FIFO) type of queue. Of course, the buffer 700 can optionally be configured in any manner, and it is not limited to a FIFO scheme.

When compared and contrasted with the newer images, the combination of the older and newer images provides a robust mechanism for determining depth. When that older image is ejected, however, it has traditionally been the case that there is a significant reduction in the amount of data that is now available to determine depth. Because of that reduction, it follows that the resulting depth computation will also not be as robust. The disclosed embodiments are designed to mitigate the effects that occur when an image is ejected from the buffer 700 so that a robust depth computation and resulting pose estimation can be performed.

Returning to FIG. 4, the service 405 is tasked with identifying 2D feature points 430 from the images, as discussed. For instance, the 2D feature points 615, 620, and 625 from FIG. 6 are representative of the 2D feature points 430.

The service 405 is also tasked with computing so-called "representative measurements" or "pseudo measurements," as illustrated by representative measurement 435. In some cases, a representative measurement 435 is computed for each of the 2D feature points in the images. As an example, a first representative measurement is computed for the 2D feature point 615, a second representative is computed for the 2D feature point 620, and a third representative measurement is computed for the 2D feature point 625. Each of these representative measurements correlate or are associated with the 3D feature 505 from FIG. 5.

It should be noted how some embodiments refrain or do not compute a representative measurement for each 2D feature point. In some cases, the number of representative measurements may be less than the number of 2D feature points for a particular 3D feature. For instance, suppose 5 images commonly observe the same 3D feature. The service may identify five 2D feature points for that 3D feature (i.e. one 2D feature point in each image). Some embodiments may then generate five different representative measurements. Other embodiments, however, may generate less than five representative measurements. For instance, some embodiments may generate 1, 2, 3, or 4 representative measurements.

The representative measurement 435 includes a determined depth 435A that is determined for the 3D feature 505 (relative to the camera that generated the image). The representative measurement 435 also includes a determined uncertainty value 435B for that determined depth 435A. The uncertainty value 435B reflects a corresponding measure of how much depth information is available (within a particular image) to determine the depth 435A for the 3D feature. Some images may have more available depth information than others, so some uncertainty values may be higher or lower for certain images. Generally, the uncertainty value 435B reflects a likelihood as to the accuracy of the computed depth 435A.

In some embodiments, the representative measurements are computed only when an image is to be ejected from the buffer 420. Thus, in some embodiments, no representative measurements are computed while the buffer 420 is being filled. The ejection of an image from the buffer 420 can be the triggering event that causes the representative measurements to be computed, including for the image that is to be ejected.

The service 405 also computes a so-called joint uncertainty 440 for the set of images 410. This joint uncertainty 440 is computed based on the combination of the representative measurements.

After the joint uncertainty 440 is computed, the service 405 permits one of the images to be ejected from the buffer 420. Optionally, a new image can be injected into the buffer 420. The joint uncertainty 440 will now operate as a "check" or "intermediary quantity" that is used to optimize the resulting representative measurements in the form of a tuning operation, as shown by tune 445.

That is, the service 405 performs a tuning operation to tune the uncertainty of the pseudo measurements (i.e. the representative measurements) in an attempt to minimize the information lost as a result of ejecting a frame from the buffer. An example will be helpful.

In one scenario, the pseudo measurements comprise a mean depth and some positive uncertainty on that depth of a single scene point relative to a camera. The depth of this pseudo measurement can be fixed to the latest estimated value (e.g., say 3.0 m). It is desirable to determine an uncertainty value in the form of a variance in this pseudo measurement in meters^2. Once the depth value and uncertainty are determined, they can be included in any subsequent estimation procedure, including a pose estimation.

The pseudo measurement uncertainties are computed as follows. Given all available observations/measurements in the buffer 420 (e.g., a sliding window) involving the image/frame to eject, including (i) previous pseudo measurements, (ii) visual observations, (iii) IMU data, and (iv) potentially other data, the service 405 can compute a measure of the joint uncertainty 440, including the frame to eject, points that that frame observes, and potentially other camera poses.

Figure 8A:
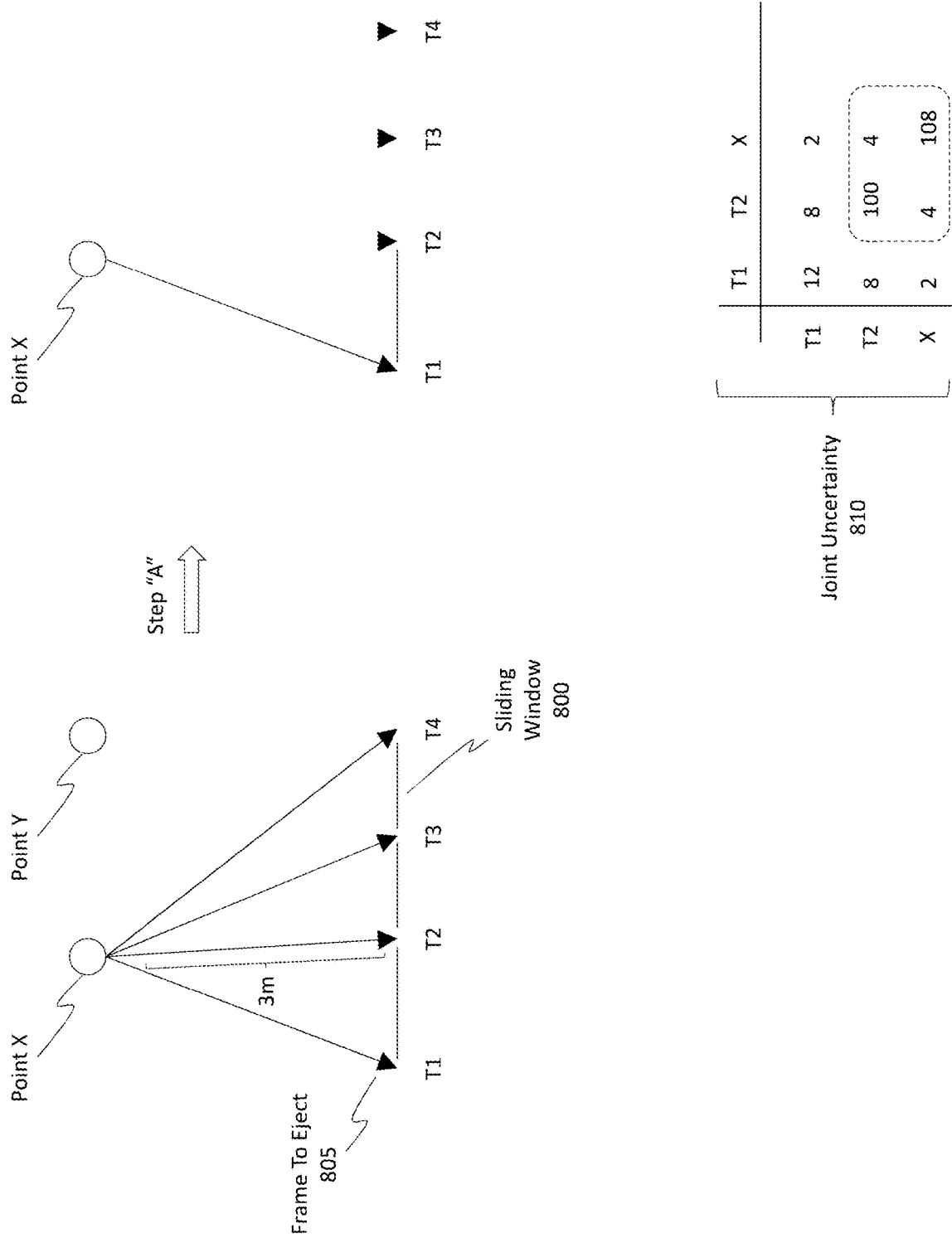

Since this computation involves correlations in multiple variables, it can be represented as a matrix. The embodiments can eject a frame and incorporate the pseudo-measurements. The embodiments can then define the uncertainty on the remaining variables after this procedure, and it is desirable for this uncertainty to be unchanged by the ejection procedure. The exact metric and procedure for this will be provided shortly. Prior to that involved explanation, a simplified example will be provided in FIGS. 8A, 8B, and 8C FIG. 8A shows a sliding window 800 with 4 frames, labeled T1-T4. FIG. 8A also shows two points X and Y. Measurements are shown using the solid lines. At this stage, there is no previous pseudo measurements, but there may have been in other scenarios. The frame-to-frame measurements could be there as well (e.g., perhaps from an IMU), but it is not strictly necessary. Frame T1 is ejected from the sliding window 800, as shown by frame to eject 805

As shown in FIG. 8A, in step "A", the service can ignore all measurements other than ones involving T1 because at this step the service is focused on preserving the information that will be lost by ejecting T1. This leaves the service with two measurements. The service computes the joint uncertainty 810 on point X, T1, and T2. In general, this joint uncertainty 810 consists of all variables correlated with T1 through any measurements and/or pseudo measurements.

As shown in FIG. 8B, in step "B", the service will compute an uncertainty on a single pseudo measurement of point X in frame T2. FIG. 8B shows a target uncertainty 815 and an actual uncertainty 820. Notice, the target uncertainty 815 corresponds to the boxed values in the joint uncertainty 810 of FIG. 8A.

It is desirable for the uncertainty on (T2, X) generated by this pseudo measurement (the dashed line between Point X and T2) to be close to some target determined by a previously computed uncertainty (e.g., the target uncertainty 815). Preferably, the values in the target uncertainty 815 would simply be copied to the actual uncertainty 820, but the service has only one number to choose (drawn as σ^2 in FIG. 8B). The pseudo measurement is not fully general, so all that can be achieved by choosing σ^2 is the rightmost matrix in FIG. 8B. The value that closely approximates the target uncertainty 815 is "close" to the elements, so the service chooses σ^2/2=108, which makes σ^2=216. There is some error in entries "100" and "4" which is tolerable.

As shown in FIG. 8C, in step "C", the service incorporates that pseudo measurement back into the sliding window with T1 ejected. The service now no longer considers the joint uncertainties previously computed. The service can augment the sliding window with a new frame and repeat this procedure, treating it as any other tracking system. Here, the pseudo measurement generation and incorporation serves as a drop-in replacement for alternative approaches that remove the oldest frame and lose information.

In general, there may be multiple points and multiple frames viewing the point X. The detailed description that will be provided momentarily is a way to generalize these scenarios and to quantify the approximations in detail. Those details aside, FIGS. 8A, 8B, and 8C are representative of the concept and intuition for the approach. The disclosed embodiments are beneficially and uniquely tailored to provide a formulation where the embodiments restrict the approximation to ignore measurements that do not involve the frame to remove.

Another simplistic example will be helpful. Suppose the service has 3 pseudo measurements— (1) depth is computed to be 3.0 m and uncertainty is 3% for a first feature point in a first image, (2) depth is computed to be 3.1 m and uncertainty is 3.2% for a second feature point in a second image, and (3) depth is computed to be 2.9 m and uncertainty is 3.1% for a third feature point in a third image. The initial joint uncertainty may be computed to be 3.05% for those three images (based on those percentage values as well as other data, such as actual depth data). The third image comprising the third feature point is then ejected, so the data for the first and second feature points remains. The service then modifies or "tunes" the 3% and 3.2% uncertainties (for the first and second feature points respectively) to "preserve" the 3.05% joint uncertainty.

The above description is one viable implementation of this procedure in a special case. However, in most situations, camera frames do not directly observe depth and have only 2D observations in the image. Thus, the depth uncertainty might not be directly modifiable. To address this problem, one could optionally incorporate the pseudo measurements as entirely new measurements. If there are already direct depth measurements, it would be possible to merge them in the way the described above.

Therefore, in this manner, the "joint uncertainty" is used in order to fine-tune the pseudo measurement data. The pseudo measurement data is the actual data that is used to compute the estimated pose of the device; the joint uncertainty is not used during that computation. As a result, the joint uncertainty is a "check" or an "intermediary quantity" that is used to optimize the pseudo measurement data.

Returning briefly to FIG. 4, the "tuned" representative measurement(s) are tuned in a manner so that the resulting joint uncertainty is within a threshold 450 degree relative to the joint uncertainty that was computed when the buffer 420 was full. The tuned representative measurements can then be used to compute or estimate a pose 455 for the device.

Detailed Example

Inside-out tracking is a technology used for MR devices, enabling the display of virtual content that appears stationary in the world to the user. State-of-the-art tracking is enabled with highly efficient and accurate visual-inertial odometry (VIO) modules that meet the unique compute constraints of MR systems. Generally, the VIO module takes as input timestamped images and data from an IMU. The system computes 2D feature observations corresponding to 3D world points using images, the existing 3D points, and some knowledge about the state of the device. This incorporates any of several feature detection and tracking techniques. The system may then decide if it should compute the "state" of the rig/MR system. The "state" consists of a pose of the device in a common coordinate frame and may include differentials (e.g., velocity, acceleration, etc.) and/or IMU states (e.g., accelerometer bias, gyroscope bias, and gyroscope scale factors). If the decision is "no," it waits for the next frame. Otherwise, it constructs a nonlinear least-squares optimization problem consisting of 1) keyframe/image states and the 3D positions of points and 2) constraints from available sensors, including feature observations, previously generated pseudo measurements, and the previous marginalization prior.

The state of the device at the image timestamp is incorporated as a new keyframe state. It solves this problem, enabling it to provide the state of the device to the display and other subsystems requiring updated head poses. A previous keyframe/image, such as the oldest, is then removed by some procedure, the details of which are described herein.

Figure 9:
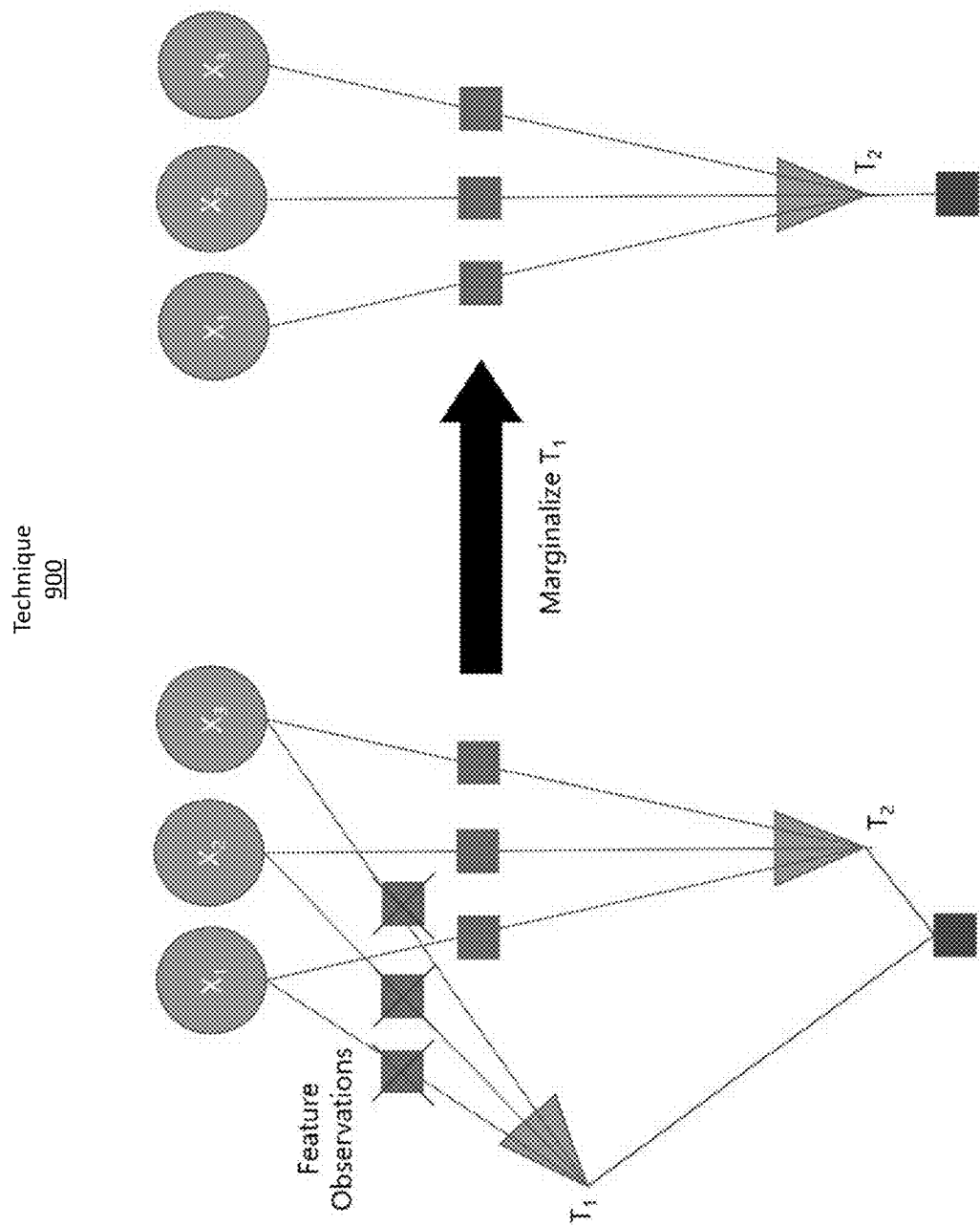
FIG. 9 illustrates a technique for observing features.

FIG. 9 illustrates a technique 900 of maintaining a sliding window of states by removing the state of the oldest keyframe. There are various measurements or constraints included in an optimization problem. Each encodes some information of the variables connected to it. The triangles represent states of the device (e.g., the MR system), and the map consists of $X_1$, $X_2$, and $X_3$. In practice, many more keyframes and points would be included, but they are omitted for illustrative purposes.

The middle squares are 2D observations of 3D points that are derived from images (e.g., feature observations). The lower square is a "marginalization prior" encoding information about the relationships between keyframes, including their relative poses and optionally constraints from inertial measurements. The transformation applied is referred to as "marginalization," which consists of certain numerical computations required to remove the oldest keyframe. Prior to marginalization, it is common to drop feature observations that are visible to both the oldest and newest keyframe. This entails a loss of information that in turn degrades tracking accuracy.

Figure 10:
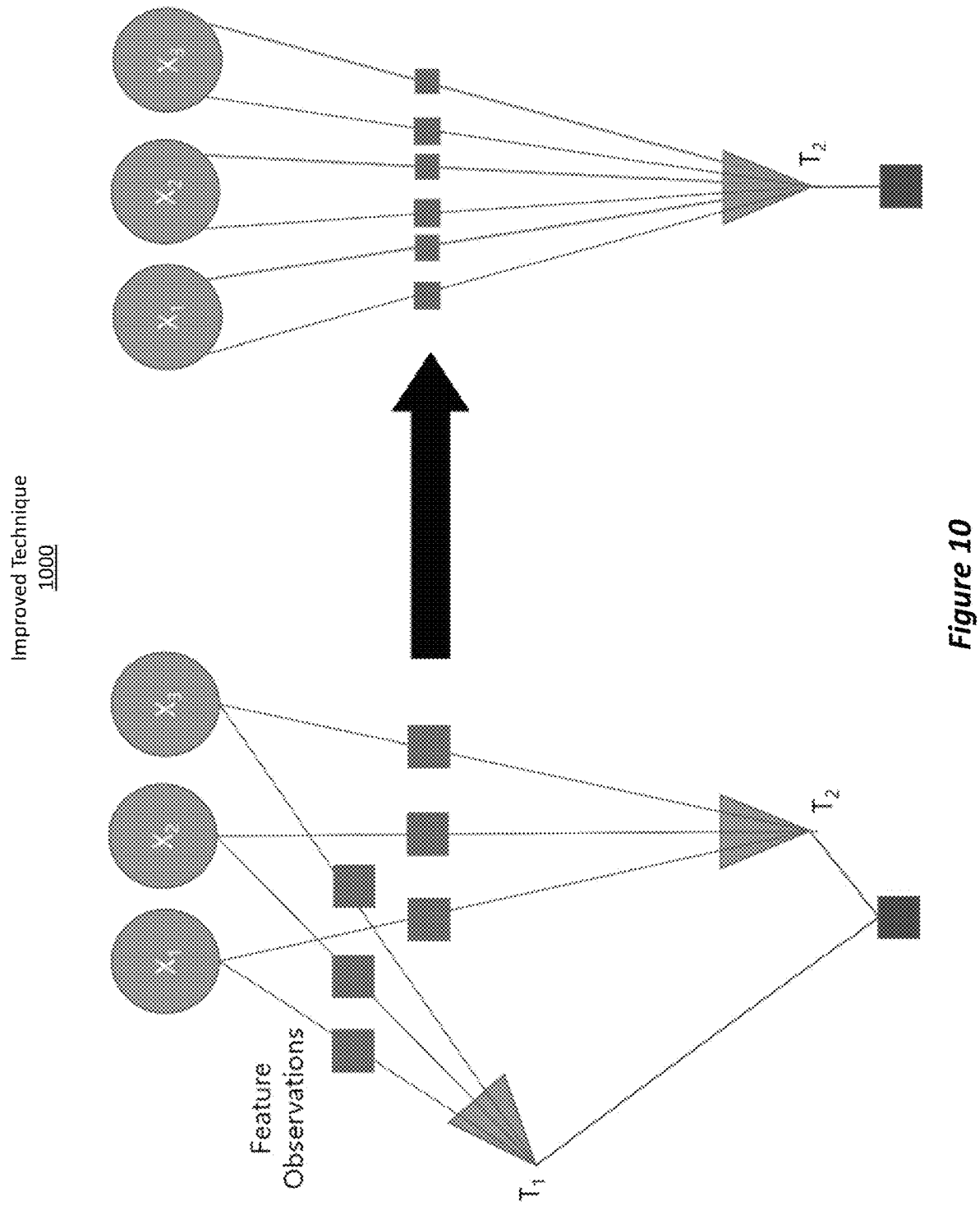
FIG. 10 illustrates an improved technique for determining depth for a feature.

FIG. 10 presents an overview of an improved technique 1000 in accordance with the disclosed details. The transformation is more complex than that of FIG. 9 and will be described in more detail shortly. Notably, the overall computational (time and space) complexity of the algorithm is linear in the size of the map, even in the worst case. The method is tailored to tracking MR applications that have unique compute constraints.

It is worth noting that although the disclosed techniques apply to VIO systems used on MR devices, the disclosed principles can be practiced in sliding-window-based visual-odometry systems that do not include IMUs. Additional sensors and constraints may complement the operations if they do not include correlations between map points. Some examples include constraints from satellite measurements from the global positioning system, magnetometers, and sensor-independent motion constraints (trajectory priors). The disclosed principles are suitable for device-mounted trackers such as motion controllers in addition to head-mounted displays. The details of concurrency and timing of operations may vary slightly. For example, the marginalization procedure may be carried out concurrently with feature detection and tracking.

A general summary of some of the disclosed operations will now be provided below.

An inertial measurement unit consisting of a gyroscope and accelerometer is embedded in a mobile device. One or more visible light cameras are attached to the device with a view of the environment. A VIO method based on a sliding window of states of the device is used to fuse visual and inertial measurements, producing an estimate of the motion of the device. States of the device are estimated by solving a nonlinear least-squares optimization problem. The updated instantaneous state of the device is returned to other subsystems.

A previous state is removed from the sliding window by a procedure that produces pseudo measurements to be incorporated in subsequent optimization problems. These pseudo measurements mitigate information loss and thus improve tracking accuracy.

Computing Uncertainties of Pseudo Measurements

The embodiments begin by considering only the part of the graph in FIG. 9 that includes only the variable to be marginalized out, $T_1$, any error terms involving this variable, and any variables involving those error terms. The latter includes the N map points $X_1, X_2, \ldots, X_N$ and the states of other keyframes clustered in $T_2$. Naïve marginalization of $T_1$ would produce a new constraint on the remaining variables. Consequently, the Gaussian distribution describing modeling the remaining variables would have a dense information matrix. This problem is often too expensive to solve due to the lack of structure. It is thus desirable to approximate this information with pseudo measurements that are associated with a sparse information matrix (FIG. 11).

Figure 11:
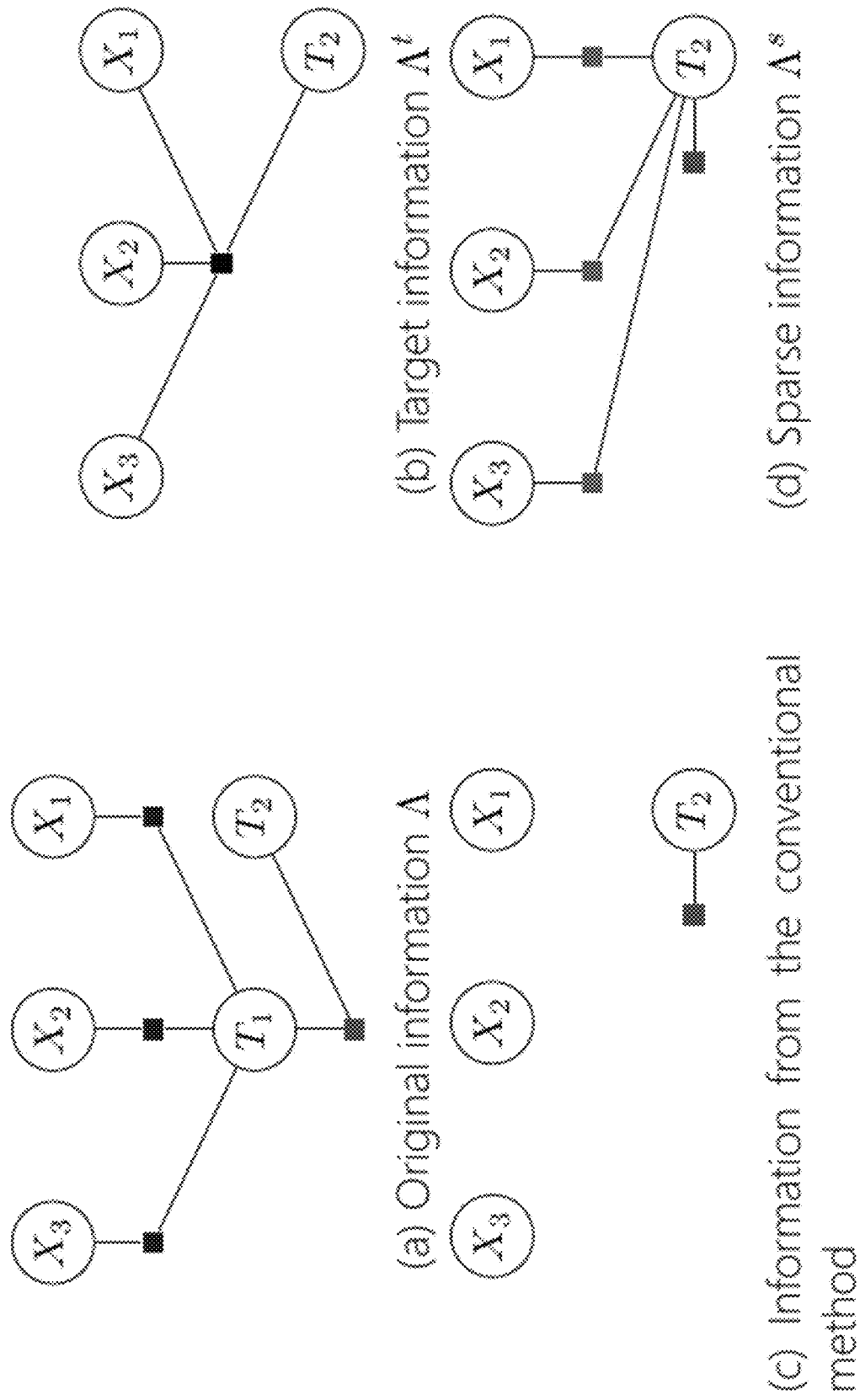
FIG. 11 illustrates an outline of some of the various processes performed to estimate a pose.

FIG. 11 shows various subgraphs consisting of a) the variable to marginalize out and related error terms, b) the information that would be produced by a vanilla marginalization procedure, c) the information that would be produced by the conventional method of dropping observations, and d) the sparse information approximating the target information with pseudomeasurements. The sparse information has the desired structure like the conventional method but retains more information.

The embodiments consider only these subgraphs and not the rest of the graph because 1) the rest of the graph is subject to change, and the embodiments choose criteria for the approximation that is independent on it, 2) marginalization of T1 has effects that are local in the graph, restricted to these variables, and 3) in this subgraph, T2 and the map are conditionally independent given the variable to marginalize out. This structure leads to an efficient linear-time algorithm.

Given the structure in (a) shown in FIG. 11, the embodiments can partition the information matrix into blocks.

$$\Lambda = \begin{bmatrix} \Lambda_{MM} & \Lambda_{BM}^T \\ \Lambda_{BM} & \Lambda_{BB} \end{bmatrix}$$

Where blocks with B correspond to $X_1$, $X_2$, $X_3$, and $T_2$. Blocks with M correspond to $T_1$. Direct marginalization would lead to the (dense) target information in (b) of FIG. 11.

$$\Lambda_t = \Lambda_{BB} - \Lambda_{BM} \Lambda_{MM}^{-1} \Lambda_{BM}^T$$

Applying the Woodbury matrix identity yields the inverse.

$$\Sigma^t = \Lambda_t^{-1} = \Lambda_{BB}^{-1} - \Lambda_{BB}^{-1} \Lambda_{BM} \left( -\Lambda_{MM} + \Lambda_{BM}^T \Lambda_{BB}^{-1} \Lambda_{BM} \right)^{-1} \Lambda_{BM}^T \Lambda_{BB}^{-1}$$

$\Lambda_{BB}$ is a block diagonal matrix and thus its inverse can be computed efficiently. The embodiments now use this to compute a sparse information matrix. Let H be the matrix of vertically stacked Jacobians of the pseudo-measurements with respect to the variables in the original subgraph. H has the following block structure, where the final column corresponds to $T_2$ and each of the previous corresponds to one of the map points.

$$H = \begin{bmatrix} H_{00} & 0 & \ldots & 0 & H_{0N} \\ 0 & H_{11} & & 0 & H_{1N} \\ \vdots & & \ddots & & \vdots \\ 0 & 0 & \ldots & H_{N-1N-1} & 0 \\ 0 & 0 & & 0 & H_{NN} \end{bmatrix}$$

Minimizing the Kullback-Liebler divergence from the sparse information to the target information yields a closed form solution. The means of the two distributions are equal, and the i'th diagonal block of the sparse information matrix provides the desired uncertainties and is given by:

$$(\Lambda_s)_i = (H\Sigma_t H^T)_i^{-1}$$

This expression can be expanded with:

$$(H\Sigma_t H^T)_i = \sum_j \sum_k H_{ij} \Sigma_{jk}^t H_{ik}^T$$

Where subscripts are zero-based block indices in their respective matrices. The two sums are only over at most two terms each, which makes computing a block of the sparse information a constant-time operation. The blocks of the covariance can also be computed in constant time. With one block per map point, the total cost is linear in the size of the map.

The blocks of the covariance matrix are computed as follows.

First, the embodiments compute a Cholesky factorization of:

$$\left(-\Lambda_{MM} + \Lambda_{BM}^T \Lambda_{BB}^{-1} \Lambda_{BM}\right)^{-1} = LL^T$$

Next, the embodiments define:

$$D = \Lambda_{BB}^{-1}$$

$$U = -\Lambda_{BB}^{-1} \Lambda_{BM} L$$

The embodiments have that $\Sigma^t = D + UU^T$. The embodiments can compute blocks of $\Sigma_{ij}^t = D_{ij} + U_i U_j^T$. The blocks of D are zero for off-diagonal blocks and a pseudoinverse of a small matrix for diagonal blocks.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 12:
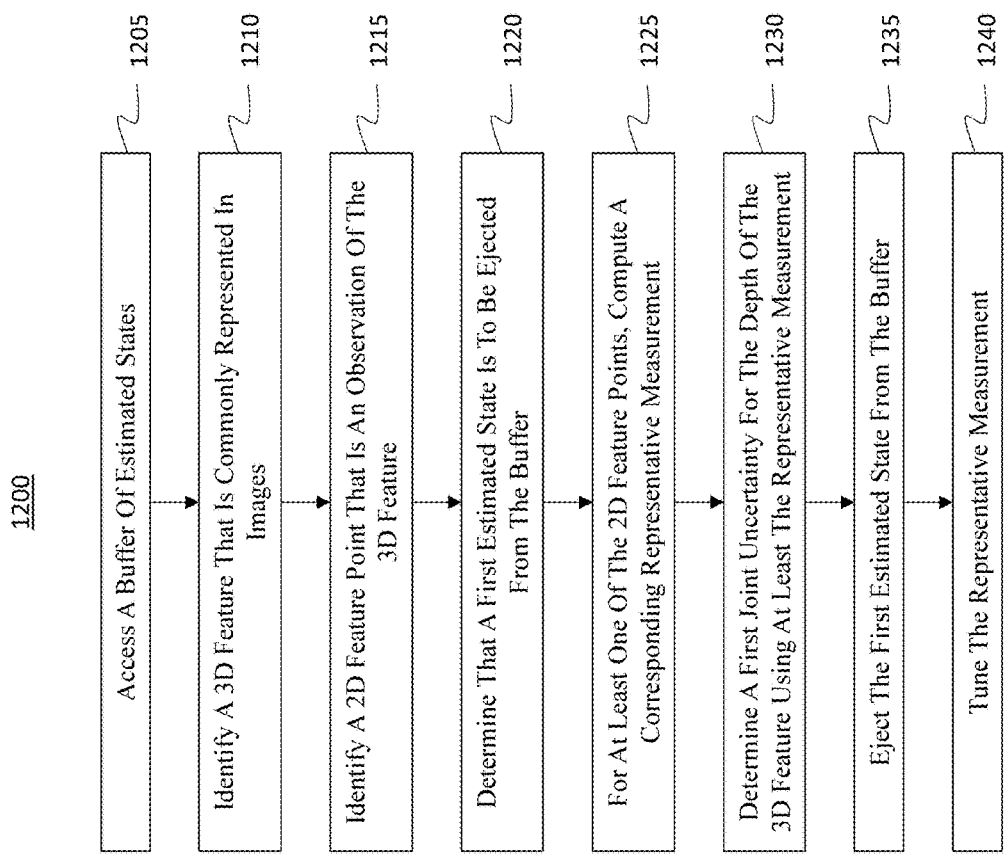
FIG. 12 illustrates a flowchart of an example method for improving how poses are determined.

Attention will now be directed to FIG. 12, which illustrates a flowchart of an example method 1200 for (i) determining, from a number of estimated states (e.g., state 420A from FIG. 4) included in a buffer, a level of depth uncertainty for a three-dimensional (3D) feature represented in a set of images, (ii) ejecting one of the estimated states from the buffer, resulting in a modification of available data that is usable to determine depth for the 3D feature, and (iii) attempting to preserve the level of depth uncertainty even after the one estimated state has been ejected. Method 1200 can be implemented within the architecture 400 of FIG. 4. Furthermore, method 1200 can be implemented by the service 405.

Method 1200 includes an act (act 1205) of accessing a size-limited buffer of estimated states that are generated based on visual observations derived from multiple images. In some embodiments, the buffer can also include the multiple images, including a first image and a second image. The first image and/or a first estimated state can, in some implementations, be an oldest image or the oldest state in the size-limited buffer. In some cases, the first image and/or a first estimated state might not be the oldest image. Optionally, a number of images and/or states included in the size-limited buffer is set so that the size-limited buffer is full to capacity. In some cases, after certain actions are performed (e.g., extract 2D feature points), the images can be discarded from the buffer. Optionally, the number of estimated states that are included in the buffer is set so that the buffer is full to capacity. The estimated states include pose information as reflected in the multiple images. In addition to the estimated states, the buffer can also include visual observations derived from the images. The estimated states can also include other variables associated with a time instance when the images are acquired. For instance, the other variables can include velocity and intrinsic or extrinsic parameters of sensors on the device. The buffer maintains estimates of these states, which can be updated given new information. When states are eventually ejected from the buffer, the system can commit to their respective estimates.

Act 1210 includes identifying a 3D feature that is commonly represented in the images. For instance, the 3D feature 505 may be identified in each of the images 600, 605, and 610.

Act 1215 includes identifying, within each one of the images, a two-dimensional (2D) feature point that is an observation of the 3D feature. As a result, multiple 2D feature points are identified. Notably, the images provide data that is usable to determine a depth for the 3D feature.

Act 1220 includes determining that a first estimated state is to be ejected from the size-limited buffer. Optionally, a first image can additionally or alternatively be ejected from the buffer. This may occur because a new image may now be available for insertion into the buffer or because a new estimated state is to be inserted into the buffer.

For at least one of the 2D feature points, act 1225 includes computing a corresponding representative measurement (aka pseudo measurement) comprising a corresponding depth and a corresponding uncertainty value for that depth. Consequently, one or more representative measurements are computed. Each of the uncertainty values reflects a corresponding measure of how much depth information is available to determine the depth for the 3D feature.

In greater detail, it can be said that for a measurement with N values, the uncertainty value is the N by N covariance matrix of a Gaussian distribution. It could also be the inverse of that matrix or something equivalent.

Each of the uncertainty values is also often based on pixel resolutions for the images. An image with a higher pixel resolution provides a better framework for determining depth as compared to an image with a lower pixel resolution.

Act 1230 includes determining a first joint uncertainty for the depth of the 3D feature using at least the one or more representative measurements. In some implementations, the first joint uncertainty takes into account both actual depth measurement data and the one or more representative measurements.

Act 1235 includes ejecting the first image and/or the first estimated state from the size-limited buffer, resulting in a modification to the data that is usable to determine the depth for the 3D feature.

After the first image and/or the first estimated state is ejected, act 1240 includes tuning the one or more representative measurements until a resulting second joint uncertainty, which is based on the tuned one or more representative measurements, is within a threshold level of similarity to the first joint uncertainty despite there being the modification to the data that is usable to determine the depth for the 3D feature. Stated differently, the uncertainties of the representative measurements are tuned. The depth values are typically fixed. Uncertainties associated with measurements and pseudo/representative measurements are used subsequently in pose estimation. The use of measurements and uncertainties for the purpose of estimation can be done with weighted least-squares, Kalman filtering, or similar approaches.

The method can further include an act of estimating a pose for the MR system or computer system using at least the modified representative measurements. The pose estimate is performed with the representative measurements and the uncertainties of those pseudo-measurements, but not the joint uncertainty previously used in computing those pseudo-measurements. Pose estimation generally requires measurements and one uncertainty associated with each, which is why only the pseudo-measurement value and uncertainty are used.

Optionally, motion data can also be used to facilitate the estimation of the pose. In some cases, the pose of the computer system/MR system includes one or more of differential information or motion state information. Furthermore, the pose can be estimated relative to an initial baseline pose. For instance, when the MR system is first initialized, its pose can be determined. Subsequent poses can be determined based on that initial pose, thereby tracking or reflecting how the MR system has moved throughout time with respect to the initial baseline pose. In some cases, the pose is estimated relative to a prior pose that was determined earlier in time relative to a time when the pose is estimated. That is, the prior pose need not necessarily be the initial baseline pose.

Figure 13:
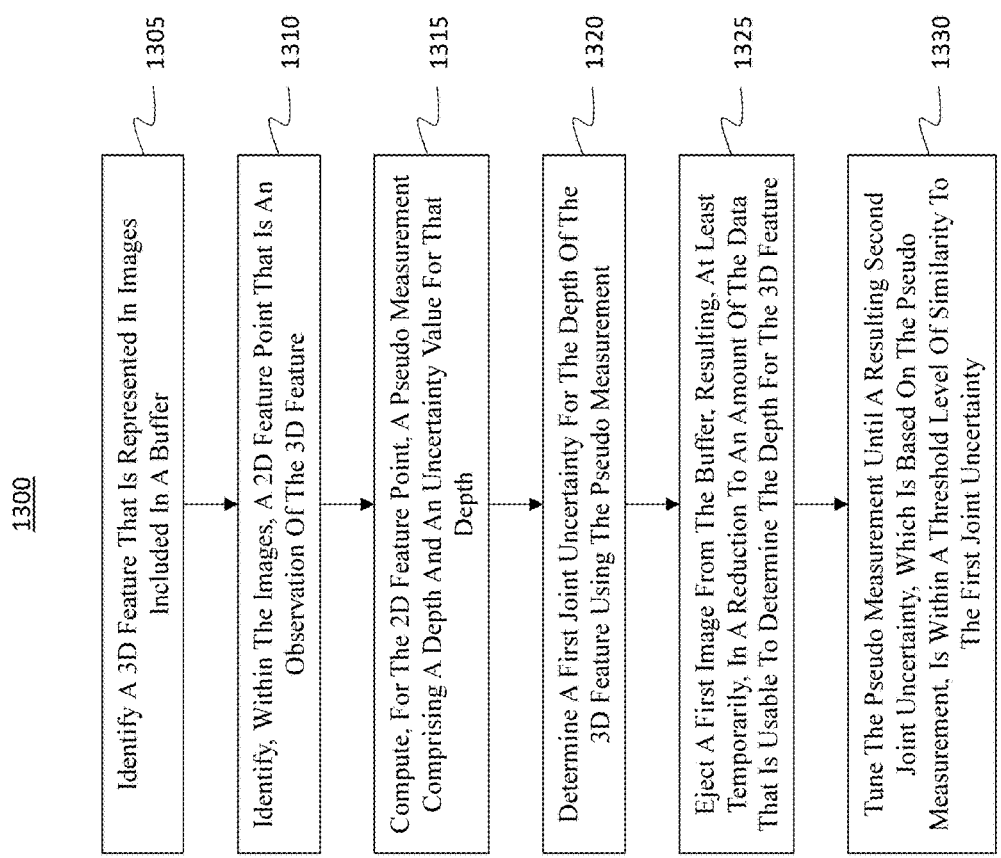
FIG. 13 illustrates another flowchart of an example method for improving how poses are determined.

FIG. 13 illustrates another flowchart of an example method 1300 for attempting to preserve a level of uncertainty for a computed depth of a three-dimensional (3D) feature that is represented within a set of images, even after one of the images is subsequently no longer available to assist in determining the depth. Method 1300 can also be implemented by the service 405 of FIG. 4.

Method 1300 includes an act (act 1305) of identifying a 3D feature that is represented in images included in a buffer. The images comprise a first image and a second image, and the images provide data that is usable to determine a depth for the 3D feature.

Act 1310 includes identifying, within the images, a two-dimensional (2D) feature point that is an observation of the 3D feature.

Act 1315 includes computing, for the 2D feature point, a pseudo measurement comprising a depth and an uncertainty value for that depth. Beneficially, the pseudo measurement approximates the observations that have been or that will subsequently be removed as a result of the first image being ejected from the buffer. The pseudo measurement can be one pseudo measurement included in a plurality of pseudo measurements. The pseudo measurement can include a displacement metric comprising any one of a 1 degree of freedom (DOF) measurement, a 3 DOF measurement, a 6 DOF measurement, or even a 9 DOF measurement. Generally, the pseudo measurement is not more than 9 DOF. It is typically some measurement involving a 3D point and a 6 DOF pose. The formula for that measurement would be fixed, and only its uncertainty would be tuned.

Act 1320 includes determining a first joint uncertainty for the depth of the 3D feature using the pseudo measurement.

Act 1325 includes ejecting the first image from the buffer, resulting, at least temporarily, in a reduction to an amount of the data that is usable to determine the depth for the 3D feature. The reduction to the amount of the data that is usable to determine the depth for the 3D feature includes a reduction in a number of observations that are in the images and that are available with respect to the 3D feature.

Act 1330 includes tuning the pseudo measurement until a resulting second joint uncertainty, which is based on the pseudo measurement, is within a threshold level of similarity to the first joint uncertainty. Tuning the pseudo measurement can include modifying the uncertainty value for the depth that is a part of the pseudo measurement. In some implementations, the uncertainty value is determined just once as opposed to modified from some previous value.

Method 1300 can further include injecting a new image into the buffer. The process may then repeat itself using this new image. In some cases, method 1300 can include an act of identifying redundant pseudo measurements. To be "redundant," one pseudo measurement may have the same values as another pseudo measurement. Alternatively, to be "redundant," one pseudo measurement may have values that are within a threshold level of similarity to the values of another pseudo measurement. The method can then include an act of preserving pseudo measurements that are not redundant and potentially eliminating pseudo measurements that are redundant. The embodiments can also potentially merge the pseudo measurements with existing measurements simply by only reducing the uncertainty of existing measurements. This may result in some additional computational benefits.

Accordingly, the disclosed embodiments are directed to various techniques that improve how poses of a device are estimated based on depth data. The embodiments are able to provide a highly accurate estimate even when observation data that is used to compute the depth data is lost when an image is ejected from a sliding window or buffer.

Example Computer/Computer Systems

Figure 14:
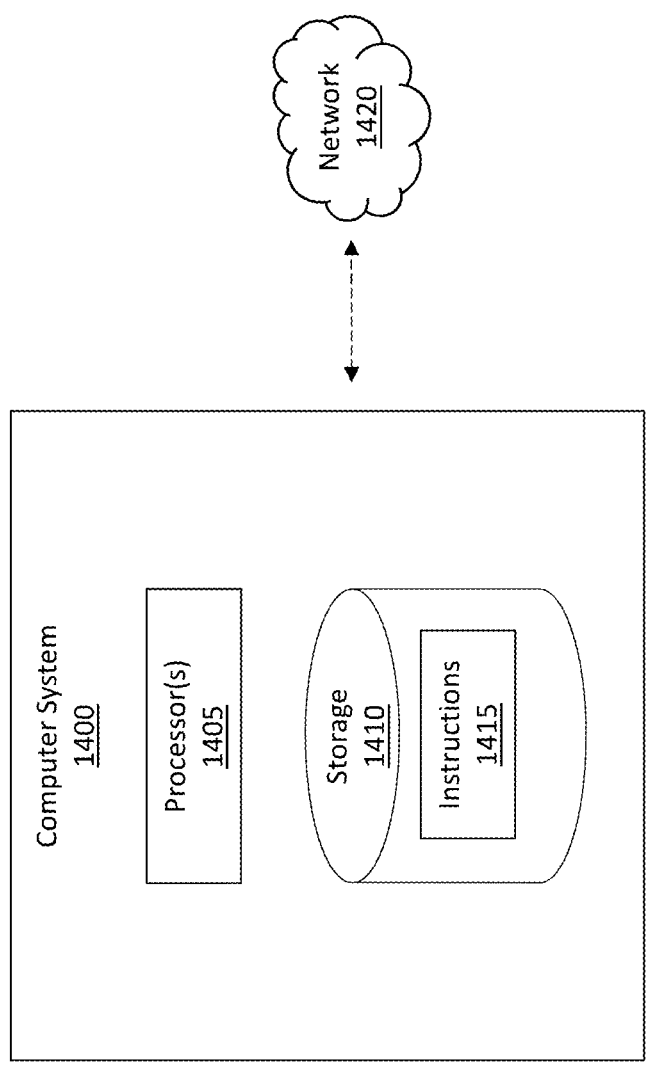
FIG. 14 illustrates an example computer system that can be configured to perform any of the disclosed operations.

Attention will now be directed to FIG. 14 which illustrates an example computer system 1400 that may include and/or be used to perform any of the operations described herein. Computer system 1400 can implement the service 405 of FIG. 4.

Computer system 1400 may take various different forms. For example, computer system 1400 may be embodied as a tablet, a desktop, a laptop, a mobile device, or a standalone device, such as those described throughout this disclosure. Computer system 1400 may also be a distributed system that includes one or more connected computing components/devices that are in communication with computer system 1400.

In its most basic configuration, computer system 1400 includes various different components. FIG. 14 shows that computer system 1400 includes one or more processor(s) 1405 (aka a "hardware processing unit") and storage 1410.

Regarding the processor(s) 1405, it will be appreciated that the functionality described herein can be performed, at least in part, by one or more hardware logic components (e.g., the processor(s) 1405). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 1400. The different components, modules, engines, and services described herein may be implemented as objects or processors that execute on computer system 1400 (e.g. as separate threads).

Storage 1410 may be physical system memory, which may be volatile, non-volatile, or some combination of the two. The term "memory" may also be used herein to refer to non-volatile mass storage such as physical storage media. If computer system 1400 is distributed, the processing, memory, and/or storage capability may be distributed as well.

Storage 1410 is shown as including executable instructions 1415. The executable instructions 1415 represent instructions that are executable by the processor(s) 1405 of computer system 1400 to perform the disclosed operations, such as those described in the various methods.

The disclosed embodiments may comprise or utilize a special-purpose or general-purpose computer including computer hardware, such as, for example, one or more processors (such as processor(s) 1405) and system memory (such as storage 1410), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1400 may also be connected (via a wired or wireless connection) to external sensors (e.g., one or more remote cameras) or devices via a network 1420. For example, computer system 1400 can communicate with any number devices or cloud services to obtain or process data. In some cases, network 1420 may itself be a cloud network.

Furthermore, computer system 1400 may also be connected through one or more wired or wireless networks to remote/separate computer systems(s) that are configured to perform any of the processing described with regard to computer system 1400.

A "network," like network 1420, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1400 will include one or more communication channels that are used to communicate with the network 1420. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system that (i) determines, from a number of approximated states included in a storage buffer, a level of depth uncertainty for a selected three-dimensional (3D) feature represented in a set of images, (ii) ejects one of the approximated states from the storage buffer, resulting in a modification of available data that is usable to determine a depth for the selected 3D feature, and (iii) attempts to preserve the level of depth uncertainty even after the one approximated state has been ejected, said computer system comprising:

at least one processor; and at least one hardware storage device that stores instructions that are executable by the at least one processor to cause the computer system to:

access a buffer of estimated states that are generated based on visual observations derived from multiple images, wherein the estimated states comprise pose information as reflected in the multiple images;

identify a 3D feature that is commonly represented in the multiple images;

within each one of the multiple images, identify a two-dimensional (2D) feature point that is an observation of the 3D feature such that multiple 2D feature points are identified, wherein the multiple images provide data this is usable to determine a depth for the 3D feature;

determine that a first estimated state of the estimated states is to be ejected from the buffer;

for at least one of the 2D feature points, compute a corresponding representative measurement comprising a corresponding depth and a corresponding uncertainty value for that depth such that one or more representative measurements are computed;

determine a first joint uncertainty for the depth of the 3D feature using at least the one or more representative measurements;

eject the first estimated state from the buffer, resulting in a modification to the data that is usable to determine the depth for the 3D feature; and after the first estimated state is ejected, tune the one or more representative measurements until a resulting second joint uncertainty, which is based on the tuned one or more representative measurements, is within a threshold level of similarity to the first joint uncertainty despite there being the modification to the data that is usable to determine the depth for the 3D feature.

2. The computer system of claim 1, wherein a number of estimated states included in the buffer is set so that the buffer is full to capacity.

3. The computer system of claim 1, wherein the first joint uncertainty takes into account both actual depth measurement data and the one or more representative measurements.

4. The computer system of claim 1, wherein execution of the instructions further causes the computer system to estimate a pose for the computer system using at least the tuned one or more representative measurements.

5. The computer system of claim 4, wherein motion data is also used to estimate the pose of the computer system.

6. The computer system of claim 4, wherein the pose of the computer system includes one or more of differential information or motion state information.

7. The computer system of claim 1, wherein a pose is estimated relative to an initial baseline pose.

8. The computer system of claim 1, wherein a pose is estimated relative to a prior pose that was determined earlier in time relative to a time when the pose is estimated.

9. The computer system of claim 1, wherein the first estimated state is an oldest estimated state in the buffer.

10. The computer system of claim 1, wherein each of the uncertainty values reflects a corresponding measure of how much depth information is available to determine the depth for the 3D feature.

11. The computer system of claim 1, wherein each of the uncertainty values is based on pixel resolutions for the multiple images.

12. A method for attempting to preserve a level of uncertainty for a computed depth of a selected three-dimensional (3D) feature that is represented within a set of images, even after one image of the set of images is subsequently no longer available to assist in determining the computed depth, said method comprising:

identifying a 3D feature that is represented in images included in a buffer, wherein the images comprise a first image and a second image, and wherein the images provide data that is usable to determine a depth for the 3D feature;

identifying, within the images, a two-dimensional (2D) feature point that is an observation of the 3D feature;

computing, for the 2D feature point, a pseudo measurement comprising a depth and an uncertainty value for that depth;

determining a first joint uncertainty for the depth of the 3D feature using the pseudo measurement;

ejecting the first image from the buffer, resulting, at least temporarily, in a reduction to an amount of the data that is usable to determine the depth for the 3D feature; and tuning the pseudo measurement until a resulting second joint uncertainty, which is based on the tuned pseudo measurement, is within a threshold level of similarity to the first joint uncertainty.

13. The method of claim 12, wherein the method further includes injecting a new image into the buffer.

14. The method of claim 12, wherein tuning the pseudo measurement includes modifying the uncertainty value for the depth that is a part of the pseudo measurement.

15. The method of claim 12, wherein the reduction to the amount of the data that is usable to determine the depth for the 3D feature includes a reduction in a number of observations that are in the images and that are available with respect to the 3D feature.

16. The method of claim 15, wherein the tuned pseudo measurement approximates the observations that have been removed as a result of the first image being ejected from the buffer.

17. The method of claim 12, wherein the pseudo measurement is one pseudo measurement included in a plurality of pseudo measurements.

18. The method of claim 12, wherein the pseudo measurement includes a displacement metric comprising any one of a 3 degrees of freedom (DOF) measurement or a 1 DOF measurement.

19. A computer system that attempts to preserve a level of uncertainty for a computed depth of a selected three-dimensional (3D) feature that is represented within a set of images, even after one image of the set of images is subsequently no longer available to assist in determining the computed depth, said computer system comprising:
- at least one processor; and
- at least one hardware storage device that stores instructions that are executable by the at least one processor to cause the computer system to:
  - identify a 3D feature that is represented in images included in a buffer, wherein the images comprise a first image and a second image, and wherein the images provide data that is usable to determine a depth for the 3D feature;
  - identify, within the images, a two-dimensional (2D) feature point that is an observation of the 3D feature;
  - compute, for the 2D feature point, a pseudo measurement comprising a depth and an uncertainty value for that depth;
  - determine a first joint uncertainty for the depth of the 3D feature using the pseudo measurement;
  - eject the first image from the buffer, resulting, at least temporarily, in a reduction to an amount of the data that is usable to determine the depth for the 3D feature; and
  - tune the pseudo measurement until a resulting second joint uncertainty, which is based on the tuned pseudo measurement, is within a threshold level of similarity to the first joint uncertainty.

20. The computer system of claim 19, wherein execution of the instructions further causes the computer system to:
- identify redundant pseudo measurements; and
- preserve pseudo measurements that are not redundant and eliminate pseudo measurements that are redundant.

* * * * *